US008787621B2

(12) United States Patent
Spicola, Sr. et al.

(10) Patent No.: US 8,787,621 B2
(45) Date of Patent: Jul. 22, 2014

(54) METHODS AND SYSTEMS FOR DETERMINING AND DISPLAYING ANIMAL METRICS

(71) Applicant: ClicRweight, LLC, Tampa, FL (US)

(72) Inventors: Joseph A Spicola, Sr., Tampa, FL (US); Joseph A Spicola, Jr., Tampa, FL (US); Kenneth Lee, Fairfax, VA (US); Young Kim, Herndon, VA (US)

(73) Assignee: ClicRweight, LLC, Tampa, FL (US)

( * ) Notice: Subject to any disclaimer, the term of this patent is extended or adjusted under 35 U.S.C. 154(b) by 0 days.

(21) Appl. No.: 13/832,186

(22) Filed: Mar. 15, 2013

(65) Prior Publication Data

US 2013/0322699 A1 Dec. 5, 2013

Related U.S. Application Data

(60) Provisional application No. 61/655,303, filed on Jun. 4, 2012, provisional application No. 61/751,528, filed on Jan. 11, 2013, provisional application No. 61/656,057, filed on Jun. 6, 2012.

(51) Int. Cl.
*G06K 9/00* (2006.01)

(52) U.S. Cl.
USPC ........... 382/110; 382/100; 382/190; 382/154; 382/294

(58) Field of Classification Search
USPC .................................................. 382/100–190
See application file for complete search history.

(56) References Cited

U.S. PATENT DOCUMENTS

| 4,296,918 A | 10/1981 | Hölscher |
| 4,498,424 A | 2/1985 | Leuschner |
| 4,745,472 A * | 5/1988 | Hayes ........................... 348/141 |
| 4,787,739 A * | 11/1988 | Gregory ........................ 356/4.03 |

(Continued)

FOREIGN PATENT DOCUMENTS

| WO | 2010127023 A1 | 11/2010 | |
| WO | 2010127277 A2 | 11/2010 | |
| WO | WO 2010127023 A1 * | 11/2010 | ............. A01K 29/00 |
| WO | WO 2010127277 A2 * | 11/2010 | ............. A01K 29/00 |

OTHER PUBLICATIONS

Rusinkiewicz and Marc Levoy, Efficient Variants of the ICP Algorithm, 2001 IEEE, Stanford Univ.*

(Continued)

*Primary Examiner* — Jayesh A Patel
*Assistant Examiner* — Iman K Kholdebarin
(74) *Attorney, Agent, or Firm* — Proskauer Rose LLP

(57) ABSTRACT

The invention provides, in one aspect, a computerized method for estimating a weight of an animal. The method includes acquiring an image of an animal and comparing, by at least one computing device, the image to a plurality of models to determine a selected one of the plurality of models that optimally matches a size or shape of the animal, wherein each of the plurality of models has a known weight. The method further includes adjusting, by the at least one computing device, either (i) the image relative to the selected model or (ii) the selected model relative to the image. One or more differential adjustment parameters are determined, by the at least one computing device, based upon the adjustment of the image or model; and a weight of the animal is determined, by the at least one computing device, by adjusting the known weight of the selected model based upon the one or more differential adjustment parameters.

28 Claims, 23 Drawing Sheets

(56) References Cited

U.S. PATENT DOCUMENTS

| | | | |
|---|---|---|---|
| 4,963,035 A * | 10/1990 | McCarthy et al. | 382/110 |
| 5,412,420 A * | 5/1995 | Ellis | 348/135 |
| 5,474,085 A * | 12/1995 | Hurnik et al. | 600/587 |
| 5,483,441 A * | 1/1996 | Scofield | 700/90 |
| 5,576,949 A * | 11/1996 | Scofield et al. | 702/179 |
| 5,937,080 A * | 8/1999 | Vogeley et al. | 382/110 |
| 5,944,598 A * | 8/1999 | Tong et al. | 452/158 |
| 5,990,180 A * | 11/1999 | Shioguchi et al. | 516/73 |
| 6,377,353 B1 | 4/2002 | Ellis | |
| 6,549,289 B1 * | 4/2003 | Ellis | 356/603 |
| 6,678,396 B2 | 1/2004 | Bartle | |
| 6,974,373 B2 * | 12/2005 | Kriesel | 452/157 |
| 6,987,531 B2 * | 1/2006 | Kamon | 348/211.4 |
| 7,039,220 B2 * | 5/2006 | Kriesel | 382/110 |
| 7,095,886 B2 * | 8/2006 | Massen | 382/154 |
| 7,128,024 B2 * | 10/2006 | Doyle, II | 119/518 |
| 7,158,915 B2 | 1/2007 | Wargon | |
| 7,214,128 B2 * | 5/2007 | Kriesel | 452/157 |
| 7,310,431 B2 * | 12/2007 | Gokturk et al. | 382/103 |
| 7,399,220 B2 * | 7/2008 | Kriesel et al. | 452/157 |
| 7,444,961 B1 * | 11/2008 | Ellis | 119/842 |
| 7,450,783 B2 | 11/2008 | Talapov et al. | |
| 7,583,391 B2 * | 9/2009 | Lu | 356/601 |
| 7,603,284 B2 * | 10/2009 | Stroman et al. | 705/7.25 |
| 7,673,587 B2 * | 3/2010 | Davies | 119/712 |
| 7,809,193 B2 | 10/2010 | Iwasaki et al. | |
| 7,852,493 B2 * | 12/2010 | Massen et al. | 356/625 |
| 7,853,046 B2 * | 12/2010 | Sharony | 382/110 |
| 7,949,414 B2 * | 5/2011 | Blaine et al. | 700/29 |
| 8,036,429 B2 * | 10/2011 | Doyle, II | 382/110 |
| 8,064,731 B2 * | 11/2011 | Zouhar et al. | 382/294 |
| 8,233,873 B2 | 7/2012 | Principe et al. | |
| 8,351,656 B2 * | 1/2013 | Spicola et al. | 382/110 |
| 8,355,885 B2 | 1/2013 | Krien | |
| 8,369,566 B2 * | 2/2013 | Sinzinger et al. | 382/100 |
| 8,393,296 B2 * | 3/2013 | Hofman et al. | 119/14.08 |
| 8,425,434 B2 * | 4/2013 | Mulder | 600/587 |
| 8,538,126 B2 * | 9/2013 | Peacock et al. | 382/141 |
| 8,588,476 B1 * | 11/2013 | Spicola, Jr. | 382/110 |
| 8,651,051 B2 * | 2/2014 | Hofman et al. | 119/14.08 |
| 2004/0022731 A1 * | 2/2004 | Bogdanov et al. | 424/9.6 |
| 2004/0101842 A1 * | 5/2004 | Haley et al. | 435/6 |
| 2011/0125062 A1 | 5/2011 | Mulder | |
| 2011/0196661 A1 * | 8/2011 | Spicola et al. | 703/11 |
| 2011/0279650 A1 | 11/2011 | Liao et al. | |
| 2012/0114186 A1 * | 5/2012 | Skvorc, II | 382/110 |
| 2012/0275659 A1 * | 11/2012 | Gomas et al. | 382/110 |
| 2013/0236089 A1 * | 9/2013 | Litvak et al. | 382/154 |
| 2013/0322699 A1 * | 12/2013 | Spicola et al. | 382/110 |

OTHER PUBLICATIONS (C1) International Search Report and Written Opinion from co-pending PCT patent application No. PCT/US2013/041372, dated Oct. 16, 2013, 17 pages.

Brandl, Nabil et al.; Determination of Live Weight of Pigs From Dimensions Measured Using Image Analysis; Jan. 1, 1996; Computers and Electronics in Agriculture 15 (1996) 57-72; Elsevier, 1996.

Wang, Y, Abstract: Walk-through weighing of pigs using machine vision and an artificial neural network, Biosystems Engineering, May 2008, pp. 117-125, vol. 100, Issue 1, United States.

* cited by examiner

1500

| ANIMAL WEIGHT REPORTER | | | | | Welcome, admin! Sign Out Dashboard | |
|---|---|---|---|---|---|---|
| Home   Report | | | | | | |
| Farm Summary | Report Weight-Ranges | | | | Create New Farm | Set Weight-Ranges | |

SUMMARY REPORT [ Date: 01/07/2013 ]

| Farm Name | Edit Name | Avg Weight | ADG | Updated | Description | |
|---|---|---|---|---|---|---|
| | | | | | Update Paint Spray On/Off: | Update Spray |
| | Barn Name | Edit Name | Avg Weight | ADG | Updated | Spray On/Off |
| ▸ | Test Data | Edit | --- | --,- | 12/04/2012 | ☑ |
| ▴ | Snyder South | Edit | 110 | 2.0 | 01/07/2013 | ☑ |

| | Pen Name | Avg Weight ▾ | ADG | Update |
|---|---|---|---|---|
| ▸ | 10000001 | | 131 | 2.9 | 01/07/2013 |
| ▸ | 10000002 | | 112 | 2.0 | 01/07/2013 |
| ▸ | 10000003 | | 116 | 2.0 | 01/07/2013 |
| ▸ | 10000004 | | 101 | 1.9 | 01/07/2013 |
| ▸ | 10000005 | | 112 | 1.8 | 01/07/2013 |
| ▸ | 10000006 | | 111 | 2.0 | 01/07/2013 |
| ▸ | 10000007 | | 95 | 1.9 | 01/07/2013 |
| ▸ | 10000008 | | 96 | --,- | 01/07/2013 |
| ▸ | 10000009 | | 107 | 2.0 | 01/07/2013 |
| ▸ | 10000010 | | 95 | 1.6 | 01/07/2013 |
| ▸ | 10000011 | | 103 | 1.8 | 01/07/2013 |
| ▸ | 10000012 | | 103 | 2.2 | 01/07/2013 |

Displaying items 0-0 of 0

ANIMAL WEIGHT REPORTER  Welcome, admin! Sign Out Dashboard — 1301

Home  Report

Farm Summary | Report Weight-Ranges |  Create New Farm | Set Weight-Ranges

SUMMARY REPORT [ Date: 01/07/2013 ]

| Farm Name | Edit Name | Avg Weight | ADG | Updated | Description |
|---|---|---|---|---|---|

Update Paint Spray On/Off: [Update Spray]

| | Barn Name | Edit Name | Avg Weight | ADG | Updated | Spray On/Off |
|---|---|---|---|---|---|---|
| ▶ | Test Data | [Edit] | --- | --.- | 12/04/2012 | ☑ |
| ▲ | Snyder South | [Edit] | 110 | 2.0 | 01/07/2013 | ☑ |

| | Pen Name | Avg Weight ▼ | ADG | Updated |
|---|---|---|---|---|
| ▸ | 10000001 | 131 | 2.9 | 01/07/2013 |

| | RFID | Weight | ADG | Updated |
|---|---|---|---|---|
| ▸ | RFID002000006274 | 156 | 3.0 | 01/07/2013 |
| ▸ | RFID002000006276 | 151 | 2.5 | 01/07/2013 |
| ▸ | RFID002000006242 | 119 | 2.0 | 01/07/2013 |
| ▸ | RFID002000006272 | 154 | 3.7 | 01/07/2013 |
| ▸ | RFID002000006282 | 168 | --.- | 01/07/2013 |
| ▸ | RFID002000006290 | 150 | 3.8 | 01/07/2013 |
| ▸ | RFID002000006293 | 146 | 2.3 | 01/07/2013 |
| ▸ | RFID002000006328 | 122 | 2.1 | 01/07/2013 |
| ▸ | RFID002000006232 | 147 | 3.1 | 01/07/2013 |
| ▸ | RFID002000006263 | 123 | 1.6 | 01/07/2013 |

1630
1625
1610
1620

1800

1810

ANIMAL WEIGHT REPORTER

Home   Report

Farm Summary | Report Weight-Ranges |            Create New Farm | Set Weight-Ranges Create New Weight-Range |

SETTING WEIGHT RANGE   [ Farm Name: Krahmer ]

| Index | Min Weight | Max Weight | |
|-------|------------|------------|-----------|
| 1 | 1 | 99 | Edit \| Delete |
| 2 | 100 | 149 | Edit \| Delete |
| 3 | 150 | 199 | Edit \| Delete |
| 4 | 200 | 239 | Edit \| Delete |
| 5 | 240 | 259 | Edit \| Delete |
| 6 | 260 | 500 | Edit \| Delete |
| 7 | 1 | 501 | Edit \| Delete |

ANIMAL WEIGHT REPORTER

Home   Report

Farm Summary |              Create New Farm | Set Weight-Ranges

REGISTER NEW WEIGHT RANGE   [ Farm Name: Krahmer ]         1905

Type the values below and create new farm Weight Range

RangeMin
[ 0 ]
RangeMax
[ 0 ]

Create

1910

1920

Farm Summary | Weight Range Table | Forecast |             Create New Farm | Set Weight-Ranges

FARM WEIGHT RANGE [ Farm Name: ClicRweight Date: 03/12/2013 ]

Barn Weight Range   Snyder South

| Spray On/Off: | Turn off: ○ | ○ | ○ | ○ | ○ | ○ | ○ | ○ | ● |
|---|---|---|---|---|---|---|---|---|---|
| Pen-Name | 0-170 | 171-224 | 225-259 | 260-274 | 275-294 | 295-500 | 2-502 | 260-600 |
| 10000001 | 0 | 1 | 12 | 6 | 11 | 2 | 32 | 19 |
| 10000002 | 0 | 10 | 36 | 10 | 5 | 0 | 61 | 15 |
| 10000003 | 0 | 7 | 32 | 13 | 9 | 0 | 61 | 22 |
| 10000004 | 1 | 7 | 23 | 7 | 3 | 0 | 41 | 10 |
| 10000005 | 1 | 18 | 37 | 11 | 1 | 0 | 68 | 12 |
| 10000006 | 0 | 34 | 28 | 3 | 1 | 0 | 66 | 4 |
| 10000007 | 3 | 28 | 9 | 0 | 0 | 0 | 40 | 0 |
| 10000008 | 0 | 16 | 32 | 8 | 1 | 0 | 57 | 9 |
| 10000009 | 0 | 24 | 31 | 9 | 0 | 1 | 65 | 10 |
| 10000010 | 1 | 23 | 34 | 4 | 1 | 0 | 63 | 5 |
| 10000011 | 2 | 31 | 43 | 0 | 0 | 0 | 76 | 0 |
| 10000012 | 0 | 13 | 31 | 10 | 1 | 0 | 55 | 11 |
| Total | 8 | 212 | 348 | 81 | 33 | 3 | 685 | 117 |

FIG. 14

Farm Summary | Weight Range Table | Forecast |

Create New Farm | Set Weight-Ranges

FORECAST WEIGHT RANGE [ Farm Name: ClicRweight Date: 03/25/2013 ] 7 | 14 | 21 | 28 |

Barn Weight Range   Snyder South

| Pen-Name | 0-170 | 171-224 | 225-259 | 260-274 | 275-294 | 295-500 | 2-502 | 260-600 |
|---|---|---|---|---|---|---|---|---|
| 10000001 | 0 | 0 | 2 | 3 | 10 | 16 | 32 | 30 |
| 10000002 | 0 | 2 | 11 | 23 | 16 | 6 | 61 | 47 |
| 10000003 | 0 | 0 | 15 | 11 | 16 | 14 | 61 | 44 |
| 10000004 | 0 | 1 | 11 | 8 | 10 | 5 | 41 | 27 |
| 10000005 | 0 | 8 | 23 | 14 | 15 | 6 | 68 | 37 |
| 10000006 | 0 | 5 | 41 | 10 | 7 | 1 | 66 | 19 |
| 10000007 | 2 | 17 | 15 | 5 | 0 | 0 | 40 | 5 |
| 10000008 | 0 | 8 | 16 | 11 | 18 | 1 | 57 | 31 |
| 10000009 | 0 | 7 | 22 | 16 | 16 | 2 | 65 | 35 |
| 10000010 | 0 | 8 | 26 | 15 | 12 | 1 | 63 | 29 |
| 10000011 | 0 | 10 | 43 | 15 | 6 | 0 | 76 | 22 |
| 10000012 | 0 | 2 | 18 | 13 | 15 | 4 | 55 | 34 |
| TOTAL: | 2 | 68 | 243 | 144 | 141 | 56 | 685 | 360 |

METHODS AND SYSTEMS FOR DETERMINING AND DISPLAYING ANIMAL METRICS

RELATED APPLICATIONS

This application claims the benefit of U.S. Patent Application Ser. No. 61/655,303 filed Jun. 4, 2012 entitled "Determining Weight of an Animal Based on an Image," U.S. Patent Application Ser. No. 61/751,528 filed Jan. 11, 2013, entitled "Method and System for Determining and Displaying Livestock Metrics," U.S. Patent Application Ser. No. 61/656,057 filed Jun. 6, 2012 entitled "Method and System for Determining Livestock Metrics," and U.S. patent application Ser. No. 13/832,109 entitled "Systems for Determining Animal Metrics and Related Devices and Methods," and filed this same day herewith. The entirety of all four applications is incorporated herein by reference.

TECHNICAL FIELD

The present invention relates to livestock management, and more particularly, to systems and processes for determining animal metrics (e.g., weight) based upon analysis of one or more images of the animal, and displaying animal metrics (e.g., weight) to a user.

BACKGROUND

Animal weight is an indicator of animal health, development, and yield. Knowledge of its weight is also useful before administering medicine or other forms of treatment. Typically, weight is measured using weight scales, e.g., a weight scale in the floor of a pen. Scales are expensive, can be inefficient, as they require a time delay to zero, and require maintenance to avoid build up or corrosion from farm debris.

SUMMARY

The invention, in one embodiment, features a process for determining a metric (e.g., volume, mass, or weight) and/or characteristic (e.g., gender or species) of an animal based on analysis of one or more images of the animal. By way of overview, the process can include a model with three coefficients related to height, length, and depth. A library of animal models can be used. The library can be created by measuring the weights of known animals, and categorizing the animals into subsets. The categories can include sex, size, shape, and/or age. A weight can be determined by selecting a model from the library, and adjusting the model until it "fits" the image of the animal (or vice versa). The weight of the animal is proportional to the factor by which the model is adjusted relative to the image (or vice versa). The proportional differences between height, length, and depth can be individually adjusted for more accurate weight estimation.

In another aspect, the invention provides a computerized method for estimating a weight of an animal. The method includes acquiring an image of an animal and comparing, by at least one computing device, the image to a plurality of models to determine a selected one of the plurality of models that optimally matches a size or shape of the animal, wherein each of the plurality of models has a known weight. The method further includes adjusting, by the at least one computing device, either (i) the image relative to the selected model or (ii) the selected model relative to the image. One or more differential adjustment parameters are determined, by the at least one computing device, based upon the adjustment of the image or model; and a weight of the animal is determined, by the at least one computing device, by adjusting the known weight of the selected model based upon the one or more differential adjustment parameters. In some embodiments, the image comprises a plurality of images.

In some embodiments, the image includes a plurality of cloud points representing the animal in three-dimensions, and each of the plurality of models includes a plurality of cloud points representing an animal of a known weight in three-dimensions.

In some embodiments, the method involves determining, by the computing device, the selected model by (i) calculating a deviation in cloud points between the image and each of the plurality of models, and (ii) selecting the model having the smallest deviation in cloud points. In related embodiments, the method involves determining, by the computing device, the model by (i) calculating an iterative closest point (ICP) error between the image and each of the plurality of models; and (ii) selecting the model having the smallest ICP error.

In some embodiments, the method involves adjusting, by the at least one computing device, along any of an x-axis, y-axis, or z-axis, at least one cloud point of (i) the image relative to the selected model or (ii) the selected model relative to the image.

In some embodiments, the method involves determining, by the at least one computing device, a gender of the animal by comparing a region of the image representing a gender of the animal to a corresponding region of a model having a known gender. In related embodiments, the method involves determining, by the computing device, the selected model based upon a gender of the animal.

In some embodiments, the method involves determining an additional differential adjustment parameter by comparing one or more cloud points in a region of the image to one or more cloud points of a corresponding region of the selected model, and altering the determined weight of the animal based upon the additional differential adjustment parameter. In related embodiments, further additional parameter(s) are similarly determined for other region(s). In related embodiments, the region of the image represents a depth of the animal, and the corresponding region of the selected model represents a depth of the selected model. In other related embodiments, the region of the image represents one or more body parts (e.g., rump, shoulder, back, head, feet, etc.) of the animal, and the corresponding region of the selected model represents one or more corresponding body parts (e.g., rump, shoulder, back, head, feet, etc.) of the selected model.

In further related embodiments, the method involves determining an additional differential adjustment parameter by comparing a thickness (or "depth") of the image relative to the model, and altering the determined weight of the animal based upon the additional differential adjustment parameter.

In another aspect, the invention provides a computerized method for estimating a weight of an animal. The method includes acquiring an image of an animal, wherein the image includes a plurality of cloud points representing the animal. The image is compared to a plurality of models, by at least one computing device, to determine a selected one of the plurality of models that optimally matches a size and/or a shape of the animal, wherein each of the plurality of models includes a plurality of cloud points representing an animal of a known weight. The method further includes adjusting, by the at least one computing device, at least one of height, length or depth of at least one cloud point of (i) the image relative to the selected model or (ii) the selected model relative to the image. One or more differential adjustment parameters are determined, by the at least one computing device, based upon the adjustment of the at least one cloud point; and a weight is determined, by the at least one computing device, for the animal by adjusting the known weight of the selected model based upon the one or more differential adjustment parameters.

In another aspect, the invention provides a data processing system for estimating a weight of an animal. The system includes a data store coupled to at least one computing device, wherein the data store stores a plurality of models each representing an animal having a known weight. A fitting engine that executes on the at least one computing device, wherein the fitting engine (i) compares an image of an animal to the plurality of models to determine a selected one of the plurality of models that optimally matches a size and/or a shape of the animal, (ii) adjusts either (i) the image relative to the selected model or (ii) the selected model relative to the image, (iii) determines one or more differential adjustment parameters based upon the adjustment of the image or model, and (iv) determines a weight of the animal by adjusting the known weight of the selected model based upon the one or more differential adjustment parameters.

In some embodiments, the image includes a plurality of cloud points representing the animal in three-dimensions, and each of the plurality of models includes a plurality of cloud points representing an animal of a known weight in three-dimensions.

In some embodiments, the fitting engine determines the selected model by calculating a deviation in cloud points between the image and each of the plurality of models, and selecting the model having the smallest deviation in cloud points. In related embodiments, the fitting engine adjusts at least one cloud point of (i) the image relative to the selected model or (ii) the selected model relative to the image, along any of an x-axis, y-axis, or z-axis.

In another aspect, the invention provides a computerized method for displaying animal metrics with a graphical user interface (GUI). The method includes determining, by at least one computing device, a daily weight for each of one or more animals for each of a plurality of days; determining, by the at least one computing device, an average daily weight (or, "interpolated" daily) for each of the one or more animals, wherein the average daily weight for an animal is determined based upon the plurality of daily weights for the animal; storing, in a data store coupled to the at least one computing device, the average daily weight for each of the one or more animals; and rendering, by a remote computing device coupled to the data store, a graphical user interface (GUI) window displaying the average daily weight for at least one of the animals.

In some embodiments, the method involves associating each of the one or more animals with any one of a plurality of barns. In related embodiments, the method involves displaying, in the GUI window, the average daily weight for each animal associated with a selected barn, wherein the barn is selected in response to user interaction with the GUI window. In further related embodiments, the method involves (i) associating each of the one or more animals with any one of a plurality of pens; (ii) associating each of the plurality of pens with any one of the plurality of barns; (iii) determining an average pen weight for at least one of the plurality of pens, wherein average pen weight is determined by averaging the daily weight of the one or more animals associated with that pen; and (iv) displaying, in GUI window, the average pen weight for a selected pen, wherein the pen is selected in response to user interaction with the GUI window.

In some embodiments, the method involves displaying, in the GUI window, a plurality of identifiers, wherein each identifier is uniquely associated with one of the animals. In some embodiments, each identifier comprises an RFID number.

In some embodiments, the remote device comprises any of (i) a desktop computer, (ii) laptop computer, (iii) tablet computing device, or (iv) other mobile device. In related embodiments, the remote device is coupled to the data store via any of (i) the Internet, (ii) local-area network (LAN), or (iii) wide-area network (WAN). In further related embodiments, the GUI comprises a web page, and the GUI window comprises a region of the web page.

In some embodiments, the method involves determining an average daily weight gain (ADG) for at least one of the one or more animals, wherein the ADG for an animal is based upon a plurality of daily weights for that animal. In related embodiments, the ADG is determined using a best-fit line method.

In some embodiments, the method involves determining a forecasted weight for at least one of the one or more animals, wherein the forecasted weight for an animal is based upon the ADG for that animal. In some embodiments, the forecasted weight is determined by multiplying an ADG (e.g., 2 lbs.) for an animal for a current day (e.g., "today") by a number of selected days (e.g., 14-days) after the current day, and adding the result to a current weight of the animal (e.g., 200 lbs). In some embodiments, the number of selected days is programmable or otherwise customizable (e.g., by a user interacting with the GUI or other feature of the remote device, or a systems administrator, etc.).

In some embodiments, the method involves determining a number of animals having a forecasted weight within a range of weights. In some embodiments, the method involves displaying the number of animals having a forecasted weight within the range of weights.

In another aspect, the invention provides a computerized method for displaying animal metrics with a graphical user interface (GUI), including determining, by at least one computing device, a daily weight for each of one or more animals for each of a plurality of days; determining, by the at least one computing device, an average daily weight gain (ADG) for the one or more animals, wherein the ADG for an animal is based upon a plurality of daily weights for that animal; determining, by the at least one computing device, a forecasted weight for the one or more animals, wherein the forecasted weight for an animal is based upon the ADG for that animal; determining, by the at least one computing device, a number of animals having a forecasted weight within a range of weights; rendering, by a remote computing device coupled to the at least one computing device, a graphical user interface (GUI) displaying the number of animals having a forecasted weight within the range of forecasted weights.

In some embodiments, the forecasted weight is determined by multiplying an ADG for a current day by a number of days after the current day and adding the result to a current weight (e.g., a daily weight) of the animal.

In some embodiments, the method involves associating each of the one or more animals with any one of one or more groups. In related embodiments, each group represents a farm. In some embodiments, the method involves determining, with the at least one computing device, a number of animals associated with a selected group that have a forecasted weight within a selected weight range.

In some embodiments, the method involves (i) associating one or more sub-groups with any one of the one or more groups, and (ii) associating each of the one or more animals with any one of the one or more sub-groups. In related embodiments, each sub-group represents a pen. In some embodiments, the method involves determining, with the at least one computing device, a number of animals associated with a selected sub-group that have a forecasted weight within a range of weights. In some embodiments, the method involves displaying, with the GUI, the number of animals in the selected sub-group that that have a forecasted weight within the range of weights.

In another aspect, the invention provides a computerized method for predicting animal metrics, comprising determining, by at least one computing device, a daily weight for each of one or more animals for each of a plurality of days; determining, by the at least one computing device, an average daily weight gain (ADG) for the one or more animals, wherein the ADG for an animal is based upon a plurality of daily weights for that animal; and determining, by the at least one computing device, a forecasted weight for the one or more animals, wherein the forecasted weight for an animal is based upon the ADG for that animal.

In some embodiments, the forecasted weight is determined by multiplying an ADG (e.g., for a current day) by a number of days (e.g., 14-days), and adding the result to the daily weight (e.g., 200 lbs).

In another aspect, the invention provides a method for displaying livestock metrics (e.g., with a graphical user interface, or "GUI"). More specifically, the method can include displaying on a single screen (e.g., a single web page) a farm name and metrics associated with that farm (e.g., average weight of the animals in that farm, average daily gain of all animals in that farm, etc.).

In some embodiments, the method involves displaying on the same screen a collapsible list of barns associated with that farm in response to user input (e.g., clicking on a graphical icon next to the farm name). In a related aspect of the invention, the method can include sorting the order in which metrics are displayed in response to user input (e.g., clicking on a header such as barn name, average weight, ADG, etc.).

Further related aspects of the invention can provide displaying on the same screen a collapsible list of pens associated with a selected barn (e.g., by clicking on a graphical icon next to the barn name). This display can show metrics associated with each pen (e.g., average weight of all animals in each pen, average daily gain of all animals in each pen, etc.). In a related aspect of the invention, the method can include sorting the order in which metrics are displayed in response to user input (e.g., clicking on a header such as pen name, average weight, ADG, etc.).

Yet further related aspects of the invention can provide displaying on the same screen a collapsible list of animals (e.g., identified by RFID numbers) associated with a selected pen (e.g., by clicking on a graphical icon next to the pen name). The display can show metrics associated with each animal (e.g., valid weights, average daily gain, etc.). In a related aspect of the invention, the method can include sorting the order in which metrics are displayed in response to user input (e.g., by clicking on a header such as RFID, weight, ADG, etc.).

Further related aspects of the invention can provide collapsing (or "compressing") an expanded list in response to user input (e.g., clicking on a graphical icon next to the name of an entity (e.g., pen, barn, farm, etc.). In a related aspect of the invention, when a list is expanded or collapsed, the associated graphical icon changes (e.g., from a right-facing arrow to a down-facing arrow, etc.).

In one aspect of the invention, a method is provided for displaying on a single screen a number of livestock within user-specified weight ranges across all barns and pens. In a related aspect of the invention, a user can specify the weight ranges by inputting minimum and maximum weights into a dialogue box.

In one aspect of the invention, a system is provided for marking livestock (e.g., hogs) that are within a user-defined weight range. Generally, each pen can be equipped with one or more paint sprayers that can be positioned near a water spout where the livestock go to drink water. If a hog accesses the water spout, the system can determine if that livestock's current weight is within a pre-defined weight range for being sprayed. If so, then it will be sprayed accordingly.

In one aspect of the invention, a method is provided for configuring one or more paint sprayers with a graphical user interface. More specifically, the method can include setting the weight ranges for the paint sprayers in response to user input. Weight ranges can be set on a per a farm basis, and all pens within a farm can have their paint sprayer range set to operate across the same weight range.

In a related aspect of the invention, the paint sprayers can be configured via the GUI to spray paint individual animals according to their determined weight range. Thus, for example, hogs in a first weight range can be painted blue, hogs in a second weight range can be painted green, hogs in a third weight range can be painted red, and so forth. This can, for example, allow a person physically entering a barn or pen to quickly recognize weight ranges for individual animals.

BRIEF DESCRIPTION OF THE DRAWINGS

A more complete understanding of the invention can be attained by reference to the drawings, in which:

FIGS. 6-13 show exemplary GUI displays according to one implementation of the invention.

FIG. 14 depicts an exemplary GUI display including a weight range table according to one implementation of the invention.

FIG. 15 depicts an exemplary GUI display including a forecast weight range table according to one implementation of the invention.

DETAILED DESCRIPTION

Figure 1:
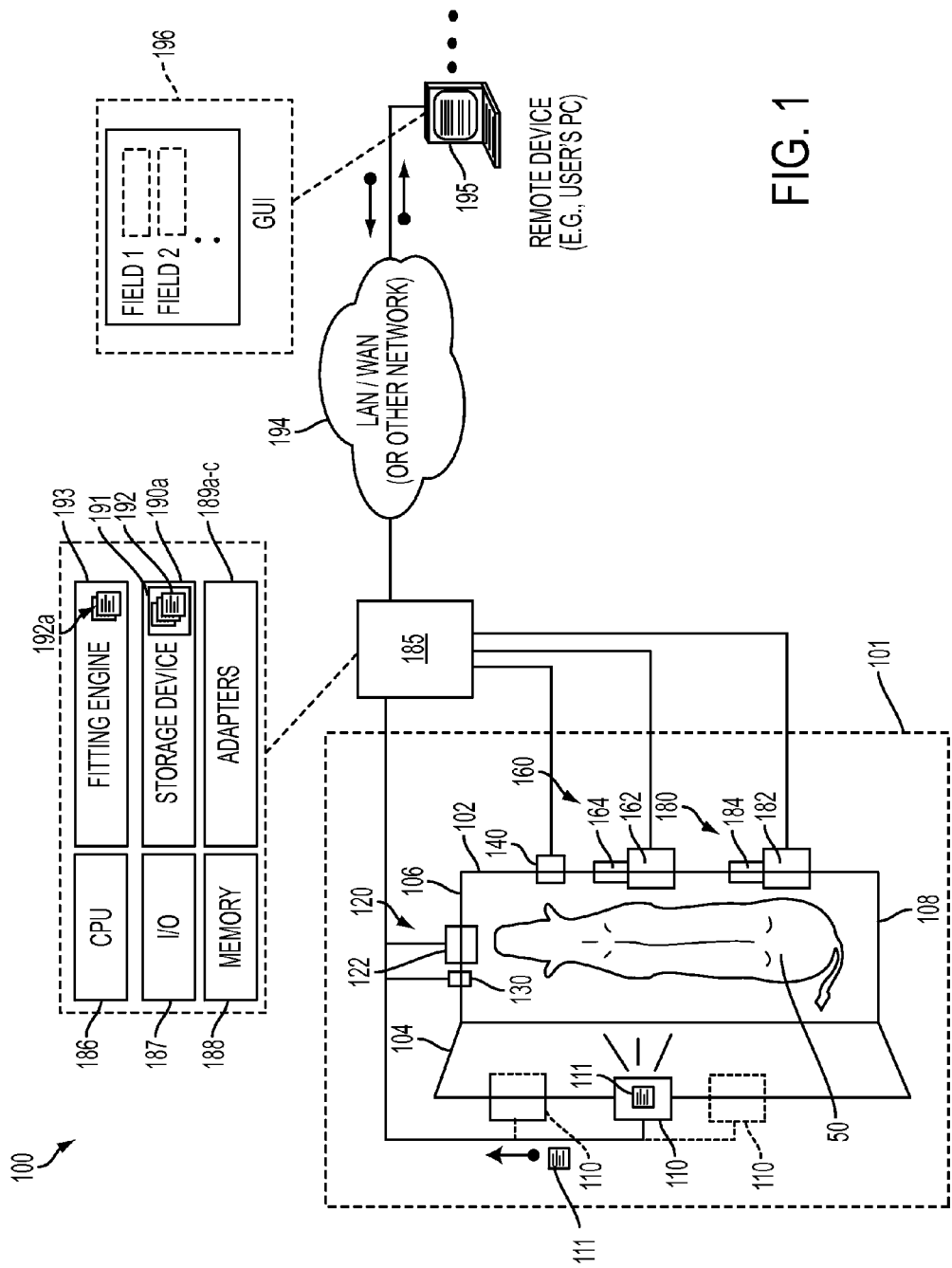
FIG. 1 depicts a system and environment for determining and displaying animal metrics (e.g., weight) based upon one or more images of an animal according to one implementation of the invention.

FIG. 1 depicts a system and environment 100 for determining and displaying metrics (e.g., weight, volume, or mass) and/or characteristics (e.g., gender or species) of an animal based upon an analysis of one or more images of the animal according to one implementation of the invention.

As shown in the illustrated embodiment, an animal positioning system (e.g., a chute system) 101 positions an animal 50 (e.g., a livestock animal, such as a pig, hog, cow, or any other kind of animal) such that an imaging system 110 can capture one or more images 111 of the animal 50. A control system 185 can analyze the image(s) 111 to determine any of a variety of metrics (e.g., weight, size, depth, height, length, thickness, volume, mass, etc.) or other characteristics (e.g., gender, species, etc.) of the animal 50. The metrics and/or other characteristics can be displayed to a user device 195 via a graphical user interface GUI 196.

In the illustrated embodiment, the chute system 101, control system 185, and remote device 195, or any sub-components thereof, are connected to each other via one or more data links (e.g., data link 194), such as the Internet, a local-area network (LAN), a wide-area network (WAN), system bus, other type of data link, or any combination thereof.

Chute System

Referring to FIG. 1, the animal positioning system (e.g., a chute system) 101 used for positioning the animal (e.g., a livestock animal, such as a pig, a cow, or other animal) 50 for analysis (e.g., determining and measuring metrics associated with an animal) can be a closed-ended chute. That is, the chute system 101 can be configured, for example, to allow the animal (e.g., only one animal) 50 to voluntarily enter and stand within the chute system for analysis and then exit the chute system (e.g., after being analyzed). For example, the animal can typically enter and exit the chute system through one (only one) entryway.

As illustrated, in some embodiments, the chute system 101 includes a frame structure that is formed of a generally rectangular framework having one or more wall structures including a datum structure (e.g., a first sidewall) 102, a positioning member (e.g., a second sidewall) 104, and an end, control wall 106 disposed at an end of the chute system that generally forms an end boundary between the first sidewall 102 and the second sidewall 104. That is, in some aspects, the first sidewall 102 is used as a datum structure along which the animal can be positioned within the chute system, and the other components of the chute system are positioned relative to the datum structure for properly positioning and imaging the animal. Use of such a datum structure in this manner helps to more easily and more consistently position the animal within the chute system.

A chute entryway 108 is positioned at an end of the chute system 101 opposite the control wall 106 so that animals can enter and exit the chute system 101. In some embodiments, the entryway 108 includes a door configured to open manually or automatically (e.g., when an animal approaches the chute system 101). Alternatively, in some embodiments, the entryway 108 is in the form of an opening (i.e., without a door) through which the animals can enter and exit the chute system 101.

The frame structure can be of various sizes based on the type of animals with which the chute system will be used. For example, for some types of pigs, the frame structure can be about 20 inches wide (i.e., the entryway 108 can be about 20 inches wide) and about two feet tall.

The second sidewall 104 typically includes a visual analysis system (e.g., an imaging system) 110 attached thereto for analyzing an animal positioned within the chute system 101. As discussed herein, the imaging system 110 can be configured to capture an image 111 (or multiple images 111) of the animal in order to determine metrics (e.g., size or weight) and/or characteristics (e.g., gender or species) of the animal 50.

The second sidewall 104 is typically angled (i.e., angled away from the first sidewall 102) to enable the imaging system 110 to better capture a side view of the animal. For example, the second sidewall 104 is angled so that a lower portion of the second sidewall 104 can be positioned close enough to a lower portion of the first sidewall 102 to properly position the animal, for example, by limiting (e.g., restricting) the available floor space on which the animal can stand within the chute system 101. That is, when an animal walks into the entryway 108, the spacing between the lower portion of the second sidewall 104 and the lower portion of the first sidewall 102 directs or guides (e.g., as a result of the limited floor space) into a consistent, desired location that is preferred for imaging the animal. As discussed below, the consistent positioning of animals within the chute system 101 by the second sidewall 104 can help to enable the imaging system 110 to consistently capture images of different animals so that the different animals can be compared to one another (e.g., for further processing).

The chute system 101 also includes various components and devices with which the animal can interact within the chute system 101. For example, the chute system 101 can include one or more of an animal detection system 120, an animal identification system 140, an animal marking system 160, and an animal injection system (e.g., an automatic or semi-automatic injection system) 180. The various systems and devices within the chute system are typically in communication with a control system 185, discussed further below, that can operate the various systems to control the chute system 101.

The animal detection system 120 can include any of various systems and devices that are configured to detect that an animal is present within the chute system. For example, in some embodiments, the animal detection system 120 includes a feeder switch 122 that, when an animal enters the chute system and begins to feed (e.g., drink water or consume a food product), the feeder switch 122 can be triggered to send a signal to the control system 185 to indicate that an animal has entered the chute system 101 and processing of the animal can begin.

The feeder switch 122 can be configured to activate and send a signal to the control system 185 as a result of the animal entering the chute system and feeding from any of various different sources, including drinking water or consuming a liquid or solid food source. Once the animal detection system 120 indicates to the control system 185 that an animal is present within the chute system 101, the control system 185 can initiate any number of metric measuring routines, such as determining the animal's weight using the information obtained by the imaging system 110. Additionally or alternatively, the animal marking system 160 or the animal injection system 180 can also be used after presence of the animal is detected.

Alternatively or additionally, the animal detection system 120 can include any of various other types of devices that can suitably detect or determine the presence of an animal and indicate the same to the control system 185. For example, in some embodiments, the animal detection system 120 includes a proximity sensor, an infrared sensor, a motion detector, photocell, or other suitable devices that, can detect the presence of an animal within the chute system, and can send a detection signal to the control system 185.

Alternatively or additionally, in some embodiments, the animal detection system 120 can include at least one device configured to view the chute system 101 and visually determine when an animal has entered the chute. For example, the imaging system 110 can be used to determine when an animal has entered the chute.

In some embodiments, a temperature sensor 130 is alternatively or additionally disposed on the control wall 106 to measure an animal's temperature (e.g., the animal's internal body temperature). As illustrated, in some examples, the temperature sensor 130 is arranged just below the animal feeder 126 along the control wall 106. The temperature sensor 130 can be in the form of any of various known temperature measuring devices that are configured to measure an animal's temperature noninvasively. Examples of such temperature sensors can include an infrared-based temperature sensing device.

The imaging system 110 can include any of various imaging devices that can suitably capture one or more images 111 of the animal 50 in the chute system 101. In some embodiments, the imaging system 110 can include a stereoscopic imaging device configured to capture multiple images (e.g., in some cases simultaneously) of the animal arranged within the chute system positioned using the first sidewall 102 and the second sidewall 104. For example, the imaging system 110 can include one or more of a stereoscopic video camera, charged-coupled-devices (CCD), a photodiode array, a complimentary metal-oxide semiconductor (CMOS) optical sensor, a still photographic camera, a digital camera, a conventional two-dimension camera, three-dimensional (3D) camera or another type of imaging device. In some embodiments, the imaging system 110 can utilize a single camera 110, or multiple cameras 110.

Figure 3A:
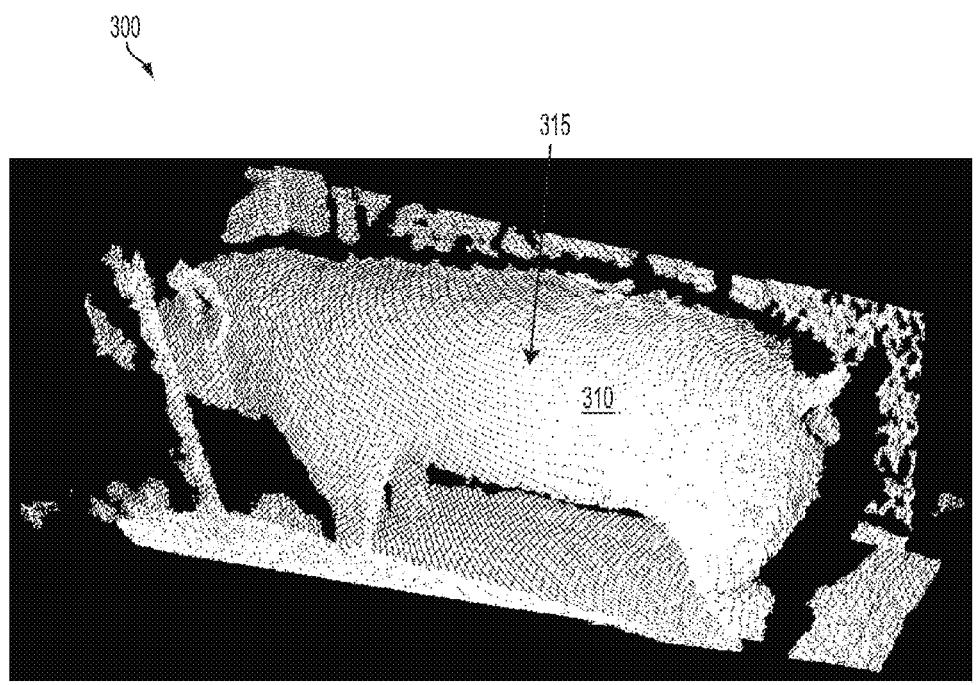
FIG. 3A depicts an exemplary three-dimensional (3D) image of an animal according to one implementation of the invention.
Figure 3B:
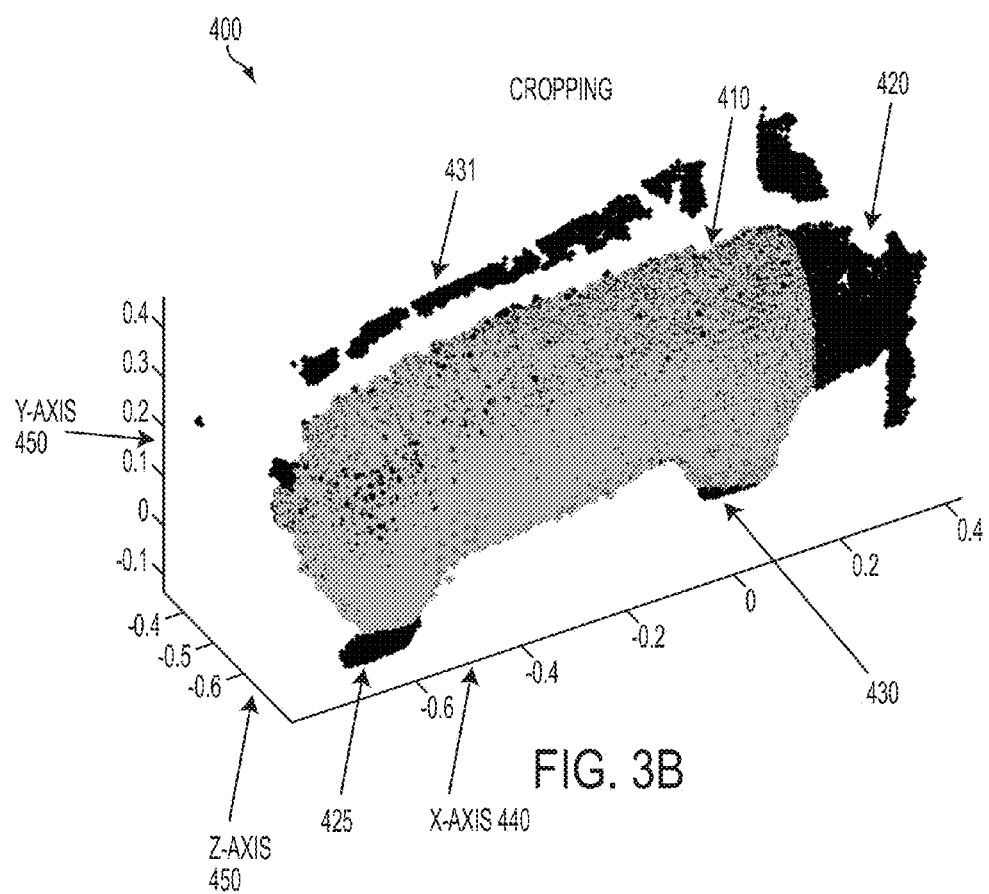
FIG. 3B depicts an exemplary cropped image of an animal according to one implementation of the invention.

In the illustrated embodiment, the image 111 is a three-dimensional (3D) scanned image, although in other embodiments it can be one or more 3D or two-dimensional (2D) images. The image 111 can be acquired by scanning one or more pre-existing 2D images (e.g., a .JPEG image), or it can be acquired directly from a scan performed by the imaging system 110. In the illustrated embodiment, the image 111 includes x-y-z coordinates that represent the animal 50 in three-dimensions. More specifically, the image 111 includes a point cloud representation of the animal 50 in three-dimensions (e.g., as shown in FIGS. 3A and 3B, discussed below); the point cloud itself includes a plurality of individual cloud points (e.g., as shown in FIGS. 3A and 3B, discussed below). In other embodiments, the point cloud can be used to create a wire-frame model of the animal 50.

In the illustrated embodiment, an image (e.g., image 111) of an animal (e.g., animal 50) can have a "length," "height," and "depth," based on one or more cloud points (e.g., possibly hundreds or thousands) plotted along an x-axis, y-axis, and z-axis, respectively, although in other embodiments it can be otherwise (e.g., in embodiments using 2D images).

In some cases, the imaging system 110 can include one or more of any number of filtering or lens controlling mechanisms. For example, an adapted lens can be used to limit the vertical and horizontal field-of-view of the imaging system, thereby manipulating (e.g., optimizing) an image area for image processing (e.g., for determining weight of the animal). The imaging system 110 can also include auto positioning and focusing systems or additional processing systems for performing image analysis including hardware components (e.g., an image processor) and/or software.

In some embodiments, the imaging system 110 includes a lighting device to illuminate the field-of-view of the imaging system 110. The lighting device is typically arranged to illuminate a broadside of the animal (e.g., the side view of the animal) when the animal is positioned within the chute system 101, for example, while feeding from the animal feeder 126. The lighting device can include one or more of any various systems or devices configured to emit suitable light to illuminate the animal. For example, the lighting device can include a linear array of lights, such as an array of monochromatic light emitting diodes (LEDs) with diffusers. In some embodiments, the lighting device is alternatively or additionally disposed on the first sidewall 102, opposite the imaging system 110. Such an arrangement of the lighting device opposite the imaging system 110 can enable the lighting device to backlight the animal so that the imaging system 110 can capture a well-defined, contrasted image of the animal.

In some embodiments, the imaging system 110 can also be used as an animal detection device (e.g., the animal detection system 120). For example, the animal detection system 120 can include the imaging system 110, which can be operated (e.g., continuously operated) to monitor the chute system 101. Once an animal is detected, for example, when the imaging system 110 (i.e., in conjunction with the control system 185) detects motion of an object (e.g., an animal) within the chute system, a signal can be sent to the control system 185 that begins processing of the animal. For example, in some cases, once motion of an animal is detected using the imaging system 110, the control system 185 can send a signal to the lighting device to illuminate the animal so that an image can be captured and the animal's metrics (e.g., weight) and/or characteristics (e.g., gender) can be determined.

Additionally, in some embodiments, the chute system 101 includes an imaging calibration system that can be used to set up and calibrate the imaging system 110 for properly capturing images of an animal positioned in the chute system 101. The imaging calibration system can be a component of the imaging system 110 or a separate component with which the imaging system 110 can interact for calibration. In some embodiments, the calibration system can include a calibration block mounted on one of the sidewalls that the imaging system view and analyze for calibration.

The imaging system 110, alone or in combination with the control system 185, is typically used to capture one or more images of animals within the chute to determine metrics associated with the animal. For example, the imaging system 110 can capture a side view image (e.g., a three dimensional image) of an animal and, based on various algorithms executed by the imaging system 110 and/or the control system 185, estimate (e.g., determine) the weight of the animal.

While the chute systems have been described generally as having one imaging system 110 that can be used to analyze an animal present in a chute system, other configurations are possible. For example, in some embodiments, the chute system includes more than one imaging system 110 (e.g., two, three, four, five or more imaging systems) in communication with the control system 185 and/or the other imaging systems.

In some embodiments, a chute system can include two imaging systems 110, which can be positioned on the same side of an animal to capture multiple side views of the animal for image processing. Alternatively or additionally, in some embodiments, one or more imaging systems are positioned generally above the chute system in order to obtain a top view image of the animal. For example, animal metrics and/or characteristics can be determined using a combination of one or more side images and one or more top images of the animal in the chute system. Additional description and details related to this type of image processing and characteristic detection can be found below.

With continued reference to FIG. 1, the animal injection system 180 typically includes an injection unit 182 connected to one of the chute walls (e.g., the first sidewall 102). The injection unit 182 can include any of various devices configured to administer (e.g., inject) a substance into an animal positioned in the chute system. For example, the injection unit 182 can include a syringe device, a repeating injector, a multi-dose syringe, or other systems or devices configured to selectively inject a fluid into an animal, for example, in response to a command from the control system 185.

As illustrated, the injection unit 182 can be connected to the chute wall via a connection mechanism (e.g., a robotic arm) 184. The connection mechanism 184 can be configured to selectively move toward and away from an animal positioned between the first sidewall 102 and the second sidewall 104 during an injection procedure.

The animal injection system 180 is typically in communication with the control system 185 to send and receive signals (e.g., injection instructions) based on signals received from one or more other systems of the chute system 101. For example, in some embodiments, when an animal enters the chute system 101 and the imaging system 110 captures an image of the animal so that the animal's weight can be estimated (e.g., determined), an injection can be administered (based on instructions from the control system 185) in response to the determined weight of the animal. This can be beneficial since certain animals can be administered certain types of medical injections only if they have grown to a certain weight (e.g., a threshold weight). For example, if the chute system 101 determines that a pig positioned in the chute weighs at least 101 lbs (e.g., by capturing an image of the pig and processing the image as described above), the animal injection system 180 can inject the pig with certain substances (e.g., chemical castration substances). This can greatly increase the efficiency by which animals can be sorted and provided with necessary medications.

In some embodiments, the chute system 101 has an animal identification system 140 arranged along one of the chute walls (e.g., the first sidewall 102). The animal identification system 140 is configured to identify a particular animal that has entered the chute system 101. The animal identification system 140 can include one or more of various types of devices including scanners, transponder detectors, transceivers, or other types of suitable identification devices. For example, in some embodiments, the animal identification system 140 includes a radio-frequency identification (RFID) reader that is configured to communicate with and identify an RFID tag associated with an animal. For example, one or more animals in a particular area (e.g., within a pen or barn area) can each have their own RFID tag, which can be affixed to the animal, for example, affixed to the animal's ear or implanted under the animal's skin. Alternatively or additionally, in some embodiments, the animal identification system 140 can include visual identification systems, such as barcode readers (e.g., a reader that can read a barcode or marking applied to the animal using a printer (e.g., an ink-jet barcode printer or a stain printer), for example, printers manufactured by EBS Ink-Jet Systems USA, Inc of Libertyville, Ill.), configured to identify the animal based on markings applied to the animal. Alternatively or additionally, the animal identification system 140 can include a variety of other devices to read characters (e.g., numbers or letters (e.g., identification numbers)) printed on an animal. In some cases, the animal identification system 140 is configured to read any of various other types of inks or stains (e.g., semi-permanent stains (e.g., 20-24 week stains) or permanent stains) that have been applied to an animal (e.g., using a printer). Alternatively, in some embodiments, a user can manually enter the identity of the animal (e.g., by visual inspection of the animal or an identification tag on the animal). For example, the animal identification can be associated with an animal's lot or identification number, age, sex, breed, market classification, domestic information relating to growth hormones, and any other pertinent information relating to the animal. As discussed above, the animal identification system 140 is typically configured to communicate the animal identification to the control system 185 for use therein.

The animal marking system 160 can also be disposed along one of the chute walls (e.g., the first sidewall 102 in the example illustrated) so that an animal within the chute system can be marked for one or various purposes. The animal marking system 160 is configured to mark or otherwise tag animals in the chute system with a visual identifier so that they can be distinguished from one another. For example, in some embodiments, the animal marking system 160 can mark animals with different colored paints or numbers for visual identification. In some embodiments, the animal marking system 160 comprises a device (e.g., a barcode printer) configured to apply a barcode to the animal. In some examples, the animal marking system 160 comprises a printer (e.g., an ink-jet barcode printer or a stain printer), for example, printers manufactured by EBS Ink-Jet Systems USA, Inc of Libertyville, Ill. In some cases, the animal marking system 160 can apply a stain (e.g., a semi-permanent stain (e.g., a 20-24 week stain) or a permanent stain) to the animal.

Such visual identifiers applied by the marking systems for tagging or marking animals can be used for subsequent managing the animals (e.g., feeding or sorting the animals). The visual identifiers can be applied based upon a determined weight of an animal as determined using the imaging system 110. For example, if an animal's weight is greater than a predetermined threshold weight, the animal marking system 160 can apply (e.g., spray) a predetermined indicator (e.g., a mark of a predetermined colored) on the animal to serve as a visual indicator that the animal has achieved the threshold weight and can be dispositioned accordingly (e.g., to receive certain medical treatments, or proceed to processing (e.g., slaughter)).

In some embodiments, the animal marking system 160 includes a marking device (e.g., a painting device or barcode application device, as described above) 162, which can be attached to the chute wall with a connection mechanism (e.g., a robotic arm) 164. The connection mechanism 164 is typically in communication with the control system 185 and configured to selectively move toward and away from an animal positioned in the chute system for marking the animal. The connection mechanism 164 can include any of various systems or devices configured to move the marking device 162 and can be similar or substantially the same as the connection mechanism 184 discussed above.

Additional description and details of chute systems can be found in co-pending application Ser. No. 13/832,109, filed on the same day as the subject application, the contents of which are hereby incorporated by reference in their entirety.

Control System

Generally, the control system 185 controls the subsystems of the chute system 101, described above, and executes a fitting engine 193 that determines animal metrics (e.g., weight, volume, mass, shape, size, etc.) and/or characteristics (e.g., gender, species, etc.) based upon one or more images of an animal, as discussed further below. The control system 185 can further store the metrics (e.g., in data store 191) for display to a user (e.g., via GUI 196).

In the illustrated embodiment, the control system 185 can be one or more desktop computers, servers, laptops, mobile devices, custom computing devices, other computing devices, or any combination thereof, albeit as adapted in accord with the teachings hereof. An exemplary control system 185 is shown in FIG. 1, including a central processing unit (CPU) 186, random access memory (RAM) 187, input/output (I/O) circuitry 188, adapters 189a-c, a non-transitory storage medium 190, and a fitting engine 192.

The central processing unit 186 is typically a general-purpose microprocessor or central processing unit and has a set of control algorithms, comprising resident program instructions and calibrations stored in the memory 188 and executed to provide the desired functions. The central processing unit 186 executes functions in accordance with any one of a number of operating systems including proprietary and open source system solutions. In some embodiments, an application program interface (API) is preferably executed by the operating system for computer applications to make requests of the operating system or other computer applications. The description of the central processing unit 186 is meant to be illustrative, and not restrictive to the disclosure, and those skilled in the art would appreciate that the disclosure may also be implemented on platforms and operating systems other than those mentioned.

In some embodiments, the I/O circuitry 187 includes various connection ports for connecting the animal detection system 120, the imaging system 110, the injection system 180, various sensors, the animal identification system 140, and/or the animal marking system 160. In some embodiments, the animal detection system 120, the imaging system 110, the injection system 180, various sensors, the animal identification system 140, and/or the animal marking system 160 are communications-enabled components configured to communicate via the communication adapter 189c.

In the illustrated embodiment, the adapters 189a-c include a display adapter 189a for connecting the control system 185 to a display device, a user interface adapter 189b for connecting the control system 185 to user input devices, such as a keyboard, a mouse, and/or a microphone, and a communications adapter 189c for connecting the control system 185 to a network (e.g., network 194). In some embodiments, the network adapter 189c is a wireless adapter. Other embodiments can have a greater or lesser number of such adapters.

The storage medium 190 is configured to store, access, and modify a database (or "data store") 191, and is preferably configured to store, access, and modify structured or unstructured databases for data including, for example, fitting models 192, relational data, tabular data, audio/video data, and graphical data.

The illustrated fitting models 192 comprise a library (or, "set") of models that represent animals with one or more known metrics (e.g., weight, volume, mass, size, shape, etc.) and/or characteristics (e.g., gender, species, age, type, etc.). The library of models 192 can be created, for example, by weighing and categorizing (e.g., by gender, species, etc.) live animals, and acquiring an image (e.g., 3D or 2D) of each of those animals (e.g., via imaging system 110 or otherwise). In the illustrated embodiment, each fitting model 192 is a scanned image of an animal having a known weight, and each model 192 represents the animal with a plurality of cloud points in three-dimensions. In other embodiments, the cloud points can be used to generate a wire-frame model. In addition to a known weight, the models 192 can each have other known metrics or characteristics as well, such as gender, animal species, age, etc.

For example, the plurality of models 192 can include a set of forty-eight models; twenty-four male models and twenty-four female models. Both the male models and the female models can be, individually, broken into three tiers (or "subsets")—eight small, eight medium and eight large. Once an animal (e.g., animal 50) is characterized as, for example, male and large, the image of the animal (e.g., image 111) can be compared against the eight models in that tier, instead of the 48 models total. For some animals, such as cows, models can be further split into a left side or a right side category because, for example, the left side of a cow can have a larger profile than the right side.

In the illustrated embodiment, each model can have a "length," "height," and "depth" based on one or more cloud points (e.g., possibly hundreds or thousands) plotted along an x-axis, y-axis, and z-axis, respectively, although in other embodiments it can be otherwise (e.g., in embodiments using 2D models).

In the illustrated embodiment, the models 192 are stored in data store 191 on a non-transitory storage medium 190, although in other embodiments they can be stored otherwise (e.g., in one or more data stores executing on one or more separate computing systems). Additionally, although 3D models are used in the illustrated embodiment, in other embodiments, 2D models can be used.

The illustrated fitting engine 193 executes on the control system 185 to determine a weight, or other metrics (e.g., size, shape, volume, mass, etc.) and/or characteristics (e.g., gender, type, species, etc.) of the animal 50. Generally, the fitting engine 193 compares the image 111 to one or more of the models 192 in order to select a model 192a, from the set of models 192, that optimally matches a size and/or shape of the imaged animal 50. An estimated weight can be determined, for example, based upon a relationship between the image 111 and the selected model 192. For example, if the selected model is 5% "larger" than the image, an estimated weight can be determined by increasing the known weight of the model by 5%. An exemplary weight estimation process is discussed in greater detail below with reference to FIG. 2.

Although the above structure and functionality of the control system 185 is shown in a single unitary system, it will be appreciated that in some embodiments, such structure and/or functionality can be contained in multiple devices. For example, there can be multiple processors, fitting engines, data stores, etc., executing on multiple devices, e.g., in a distributed computing environment, such as a "cloud computing" environment or otherwise. Additionally, it will be appreciated that in other embodiments, the functionality of the fitting engine 193 can be contained within one or more other components, e.g., the CPU 186 or otherwise.

Remote Device

Illustrated remote device 195 comprises one or more computing devices (e.g., desktop computer, laptop computer, server computer, tablet device, mobile device, etc.) connected to the control system 185 via network 194. The remote device 130 is typically operated by a user to view animal metrics (e.g., weight, etc.) via a graphical user interface (GUI) 196, as discussed further below. For example, the GUI 131 can be a web browser, custom or generic Windows OS application, or other application designed to display and/or receive input from a user. Although only one remote device 195 is shown here, it will be appreciated that in practice many such devices 195 can be connected to the control system 185. Further details of the GUI 196 can be found below with reference to FIGS. 4-13.

Weight Estimation Process

Figure 2:
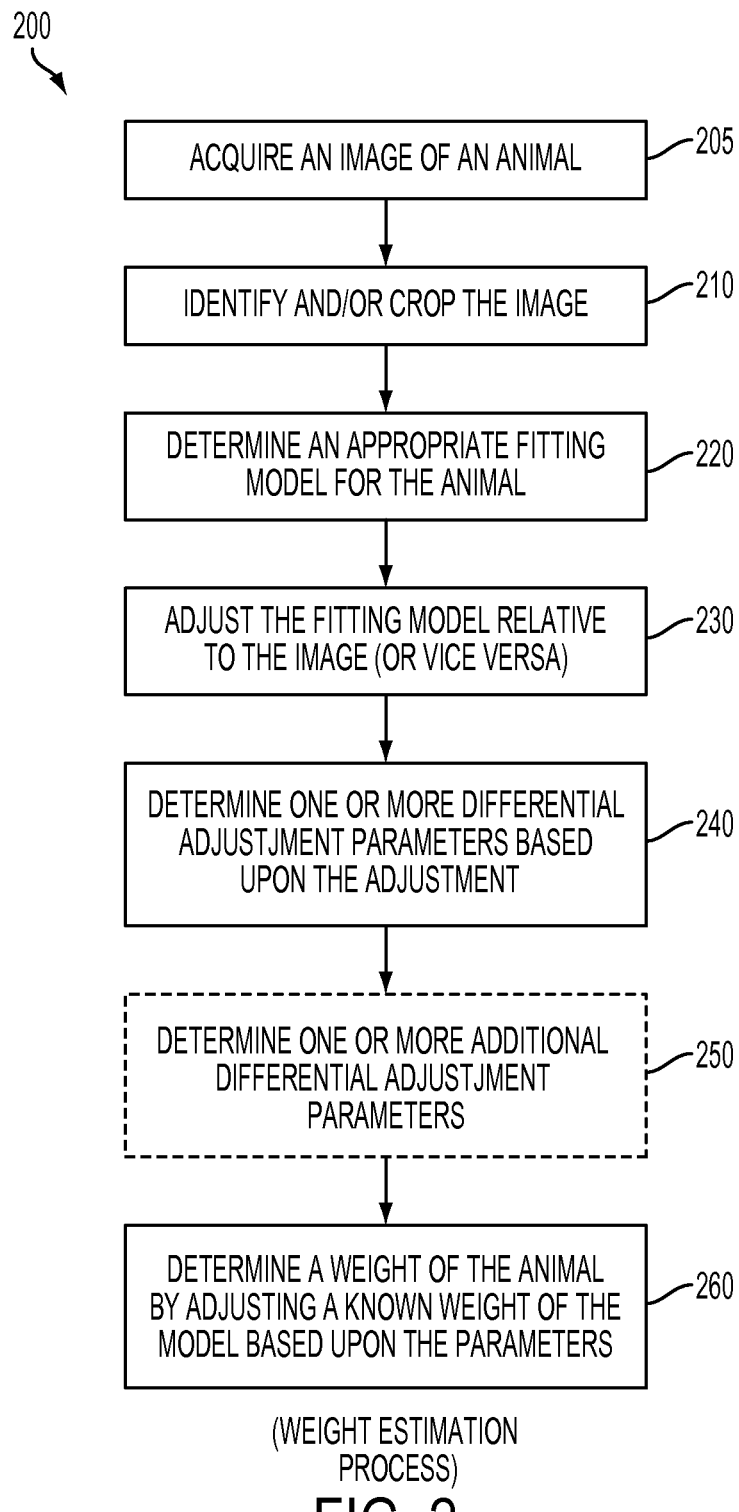
FIG. 2 depicts a flowchart showing an exemplary process for determining animal weight based upon one or more images of an animal according to one implementation of the invention.

FIG. 2 depicts an exemplary process 200 for determining animal metrics (e.g., weight) based upon one or more images of an animal according to one implementation of the invention. Although in the illustrated embodiment the animal is a livestock animal (e.g., animal 50), in other embodiments, it can be another type of animal (e.g., human, domestic animal, or wild animal). FIGS. 3A-3I are related to the process 200 according to one implementation of the invention, and are discussed in connection with the individual process steps 205-260. It will be appreciated that FIGS. 3A-3I are shown for exemplary purposes, and are not necessarily representative of every embodiment of the process 200, or the invention as a whole.

In Step 205, one or more images (e.g., images 111) of an animal (e.g., animal 50) are acquired by one or more cameras (e.g., imaging system 110). See FIG. 3A, discussed below, for an exemplary image. Multiple cameras, or multiple images, can be used, for example, to acquire different angles of the animal. Acquiring different angles of the animal can, for example, increase the coverage of the animal, which can increase an overall accuracy of the weight estimation process. When multiple cameras are used, the individual scans (or "images") can be "registered" and "merged" to form a single representation (e.g., 3D model) of the animal in a manner known in the art of image computation, albeit as modified in accord with the teachings hereof.

FIG. 3A depicts an exemplary 3D image 300 of an animal (e.g., animal 50) according to one implementation of the invention. The image 300 includes a point cloud 310 representation of the animal in three-dimensions, wherein the point cloud includes a plurality of individual cloud points (e.g., cloud point 315).

Returning back to FIG. 2, in step 210, an animal (e.g., animal 50) is identified in the image (e.g., image 111 or 300) and the image is cropped. See FIG. 3B, discussed below, for an exemplary cropped image. For example, the "leg" and "head" regions of the animal can be cropped, leaving just a "body" region of the animal. This still allows, for example, the process 200 to work because most of the weight of the animal is in the body, and the weight of the head and legs are assumed to be a small portion of the overall weight. Although the image is cropped in the illustrated embodiment, in other embodiments it can be cropped otherwise, or not at all. For example, in other embodiments, the process 200 can use the size of the head and/or legs, e.g., for a more accurate weight determination.

FIG. 3B shows an exemplary image 400 of an animal (e.g., animal 50), according to one implementation of the invention, wherein the head region 420 and leg regions 425,430 have been cropped out, as well as the surrounding points 431, leaving just a body region 410 of the animal. More specifically, the image 400 includes a plurality of cloud points representing the regions 410-431 in three-dimensions, i.e., along x-axis 440, y-axis 445, and z-axis 450. By way of example, the unit of measurement along the x, y, and z axis can be meters, although it need not be. The same unit of measurement can be applied to FIGS. 3D-3I, as well, although, again it can be otherwise.

Returning back to FIG. 2, in step 220, a fitting model (e.g., fitting model 192a) is selected (e.g., by fitting engine 193 executing on computing system 185) from a plurality of models (e.g., models 192) based upon a size, shape, gender, and/or type of the animal (e.g., animal 50). See FIG. 3C, discussed below, for an exemplary fitting model. More specifically the image (e.g., image 111 or 410) is compared to the plurality of models via a computing device (e.g., computing system 185 executing fitting engine 193) to determine a selected one of the plurality of models that optimally matches a size or shape of the animal, wherein each of the plurality of models has a known weight.

Multiple fitting models can be initially selected, and the best fitting model among those can be selected before proceeding to the next step 230. Such a process can be accomplished by comparing which fitting model's size or shape is the closest fit to the captured scan (e.g., image 111 or cropped image 410). A model can be selected, for example, by calculating the iterative closest point (ICP) error between the image and each of the fitting models (or a sub-set of the fitting models), and selecting the model with the minimum error. In other embodiments, other algorithms can be used instead of, or in addition to, ICP.

More particularly, a model can be selected, for example, by calculating the ICP error between one or more cloud points of the image and one or more cloud points of each of the fitting models (or a sub-set of the fitting models), and selecting the model with the minimum error. As above, in other embodiments, other algorithms can be used instead of, or in addition to, ICP.

Figure 3C:
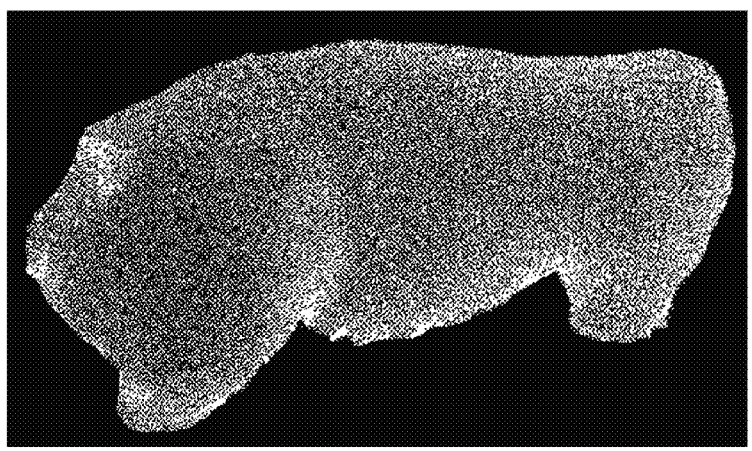
FIG. 3C depicts an exemplary fitting model according to one implementation of the invention.

An exemplary fitting model (e.g., model 192a) is depicted in FIG. 3C. The model has at least a known weight because the scan was acquired from an animal that was previously weighed (e.g., on a scale). More specifically, FIG. 3C depicts a model comprised of plurality of cloud points 500 representing an animal in three-dimensions. Although a three-dimensional model is shown here, it will be appreciated that in other embodiment the models can be two-dimensional.

Returning back to FIG. 2, in step 230, the selected model (e.g., model 192a or 500) is adjusted until it matches, or substantially matches, the captured scan (e.g., image 111 or 410). Alternatively, the image can be adjusted to match, or substantially match, the selected model. In the illustrated embodiment, ICP (or other algorithm) can be used to match the scanned image and the selected model, and ICPErr ('ICP error') indicates when the best fit has been achieved. See FIGS. 3D-3F, discussed below, for exemplary adjustments.

In some embodiments, step 230 (or other step of process 200, e.g., step 250, discussed below) can adjust at least one of height (i.e., in a y-axis direction), length (i.e., in an x-axis direction) or depth (i.e., in a z-axis direction) of at least one cloud point of (i) the image relative to the model or (ii) the model relative to the image. One or more differential adjustment parameters can be calculated based on the adjustments of the one or more cloud points, as indicated in step 240.

For example, the selected model can be adjusted in both height and length directions until it matches, or substantially matches, the image. The model is adjusted by a ratio (or "differential adjustment parameter") R1 so it is as close to the scan size as possible. The objective is to "fit" the model to the image as best as possible in the X-Y direction (minus the depth).

Figure 3D:
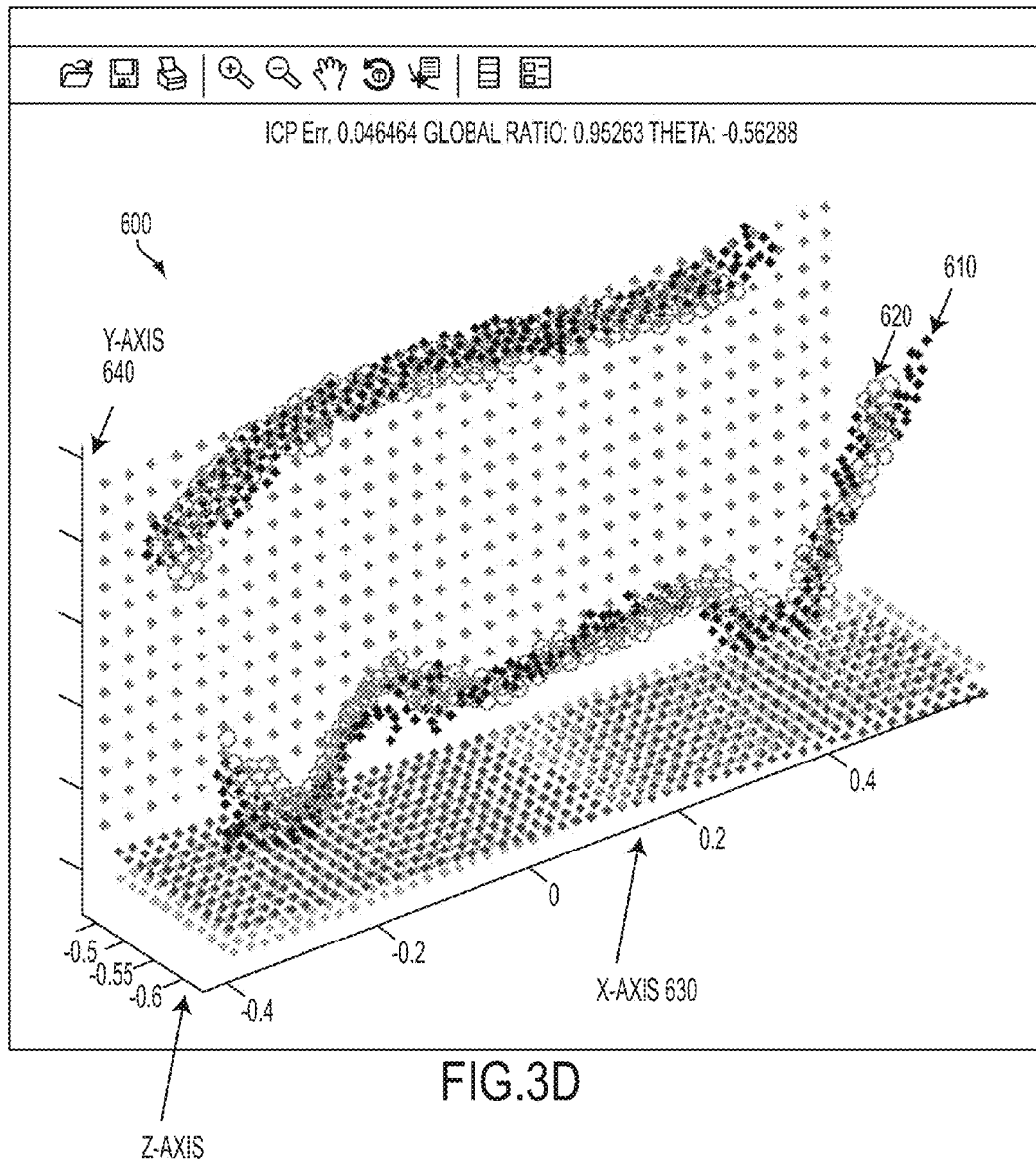
FIG. 3D depicts an exemplary height adjustment of a selected model relative to a scanned image according to one implementation of the invention.

FIG. 3D shows an exemplary height adjustment of a selected model (e.g., model 192a or 500) relative to a scanned image (e.g., image 111 or 410) plotted in a 3D graph 600. More specifically, the scanned image is represented by rectangular clouds points (e.g., cloud point 610) and the selected model is represented by circular cloud points (e.g., cloud point 620). The points are plotted in three-dimensions along an x-axis 630, a y-axis 640 and a z-axis 650. To adjust for the height of the animal (e.g., animal 50), points are selected (e.g., by fitting engine 193) around the edges at the top and bottom regions of the scanned image and the selected model in order to match, or substantially match, them together (e.g., via ICP).

Figure 3E:
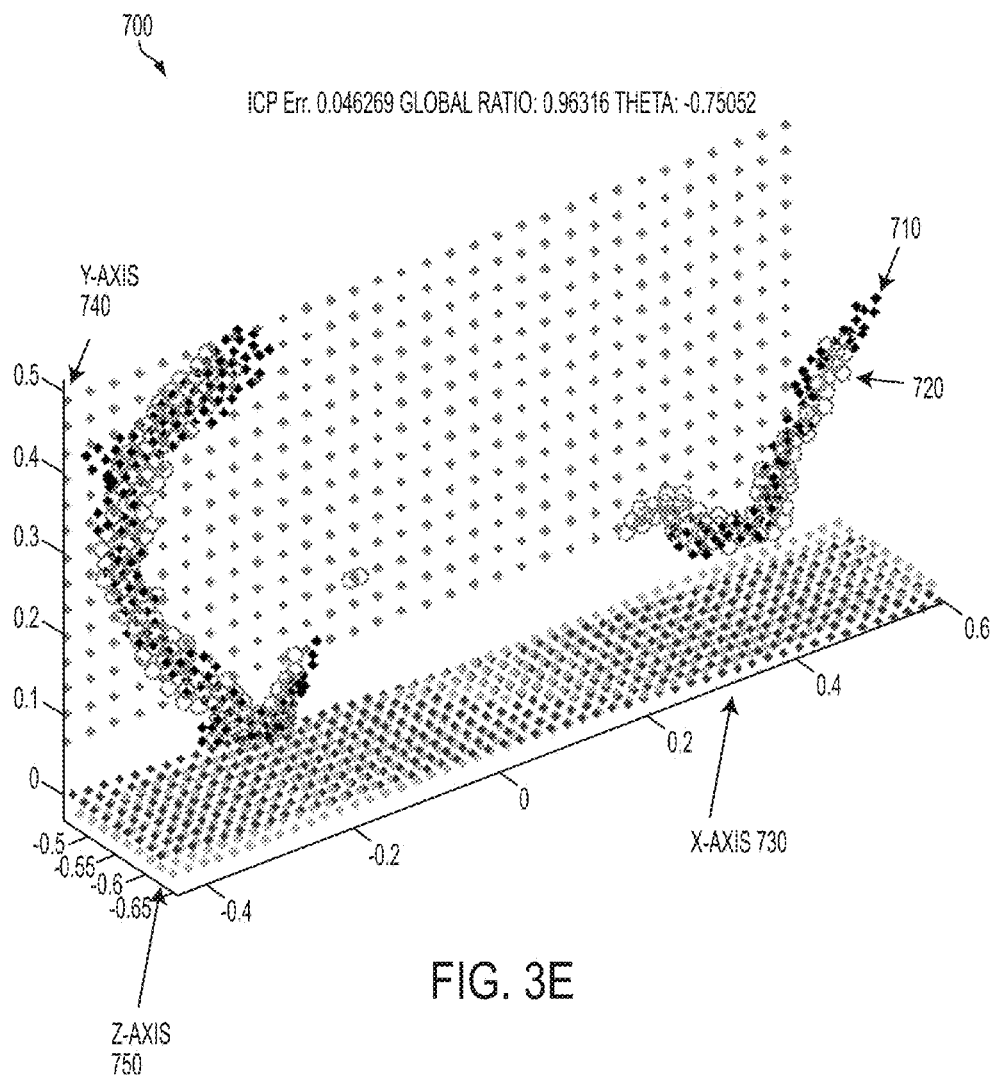
FIG. 3E depicts an exemplary length adjustment of a selected model relative to a scanned image according to one implementation of the invention.

FIG. 3E shows an exemplary length adjustment of a selected model (e.g., model 192a) relative to a scanned image (e.g., image 111 or 410) plotted in a 3D graph 700. More specifically, the scanned image is represented by rectangular clouds points (e.g., cloud point 710) and the selected model is represented by circular cloud points (e.g., cloud point 720). The points are plotted in three-dimensions along x-axis 730, y-axis 740 and z-axis 750. In order to adjust for the length of the animal (e.g., animal 50), points are selected (e.g., by fitting engine 193) around the edges at the sides of the scanned image and the fitting model in order to match, or substantially match, them together (e.g., via ICP).

Figure 3F:
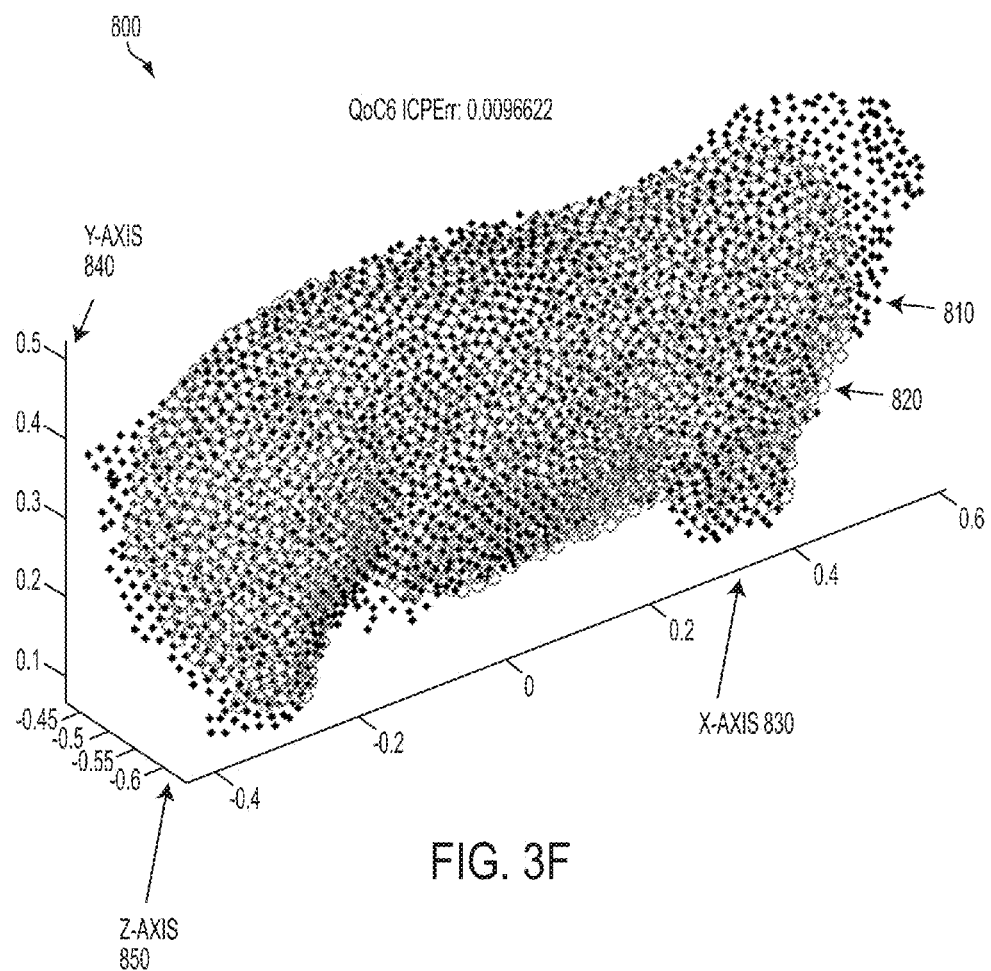
FIG. 3F depicts an exemplary fitting model adjusted for height and length versus a scanned image according to one implementation of the invention.

FIG. 3F shows a fitting model (e.g., model 192a or 500) adjusted for height and length versus the scanned image (e.g., image 111 or 410) plotted in a 3D graph 800. More specifically, the scanned image is represented by rectangular clouds points (e.g., cloud point 810) and the selected model is represented by circular cloud points (e.g., cloud point 820). The points are plotted in three-dimensions along an x-axis 830, a y-axis 840 and a z-axis 850. As illustrated, the adjusted fitting model is fairly close in size to the captured scan Returning back to FIG. 2, in step 250, one or more fine-tuning steps are performed to increase an overall accuracy of the weight determination process 200. Generally, the fine-tuning steps include determining one or more additional differential adjustment parameters by comparing one or more cloud points in a region of the image (e.g., image 111 or 410) to one or more cloud points of a corresponding region of the selected model (e.g., model 192a or 500). The determined weight of the animal can be adjusted based upon the one or more additional differential adjustment parameters. The regions can include, for example, spatial regions of the image or model (e.g., a top region, bottom region, side region, width, depth, height, length, thickness, etc.) or anatomical regions (e.g., rump, shoulder, back, legs, head, body, etc.).

Although the fine-tuning steps are shown here before the weight determination step 260, it will be appreciated that in some embodiments, the fining tuning steps 260 can be performed after or during the weight determination step shown in step 260 below. Thus for example, the fine-tunings steps 250 could be used to adjust an already determined estimated weight.

In the illustrated embodiment, the fining tuning steps include the following steps, although other embodiments may include a lesser or greater number of such steps. Indeed, in some embodiments, the weight estimation process 200 can forgo the fine-tuning steps altogether.

Fine-Tune Depth->Ratio-L

This step is to fine-tune the length of the animal. It can, for example, measure the distance from a "back" region of the animal to a "shoulder-leg" region of the animal. This step determines more accurately the length of the animal, which can be used to adjust the length of the selected fitting model (e.g., model 192a or 500). See FIG. 3G, for example. The "regions of interest" (or, simply, "region") are therefore chosen to compare just the points around the back and the shoulder in this example. Therefore, if this ratio (or "differential adjustment parameter") is different than the ratio R1, then we can use this to make the appropriate adjustment to the length (from head to rump) of the animal. As an example, if Ratio-L is less than W1, the final determined weight needs to be decreased.

Fine-Tune Depth->Ratio-D

Figure 3G:
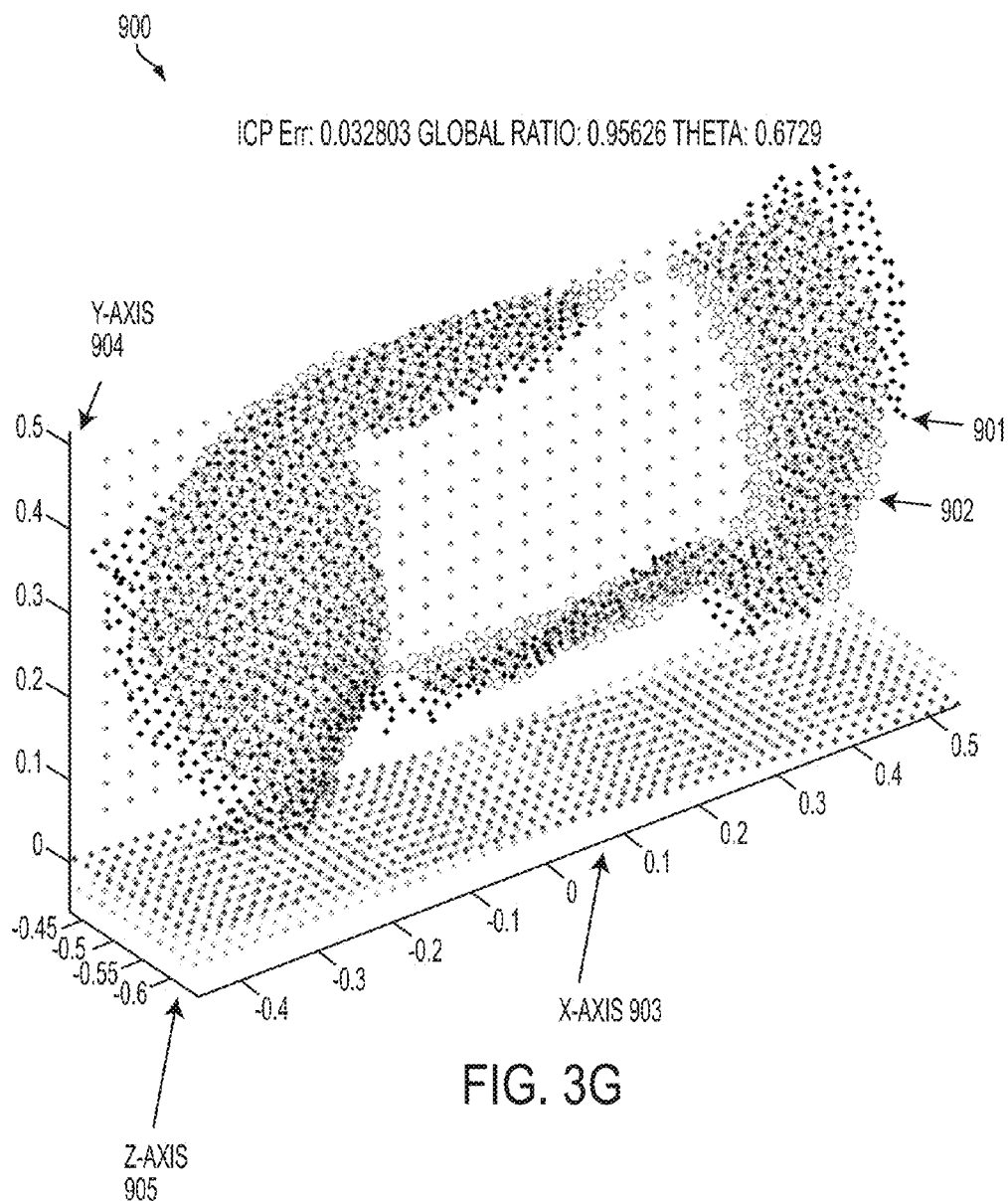
FIG. 3G depicts exemplary fine-tuning adjustments for length and depth according to one implementation of the invention.
Figure 3H:
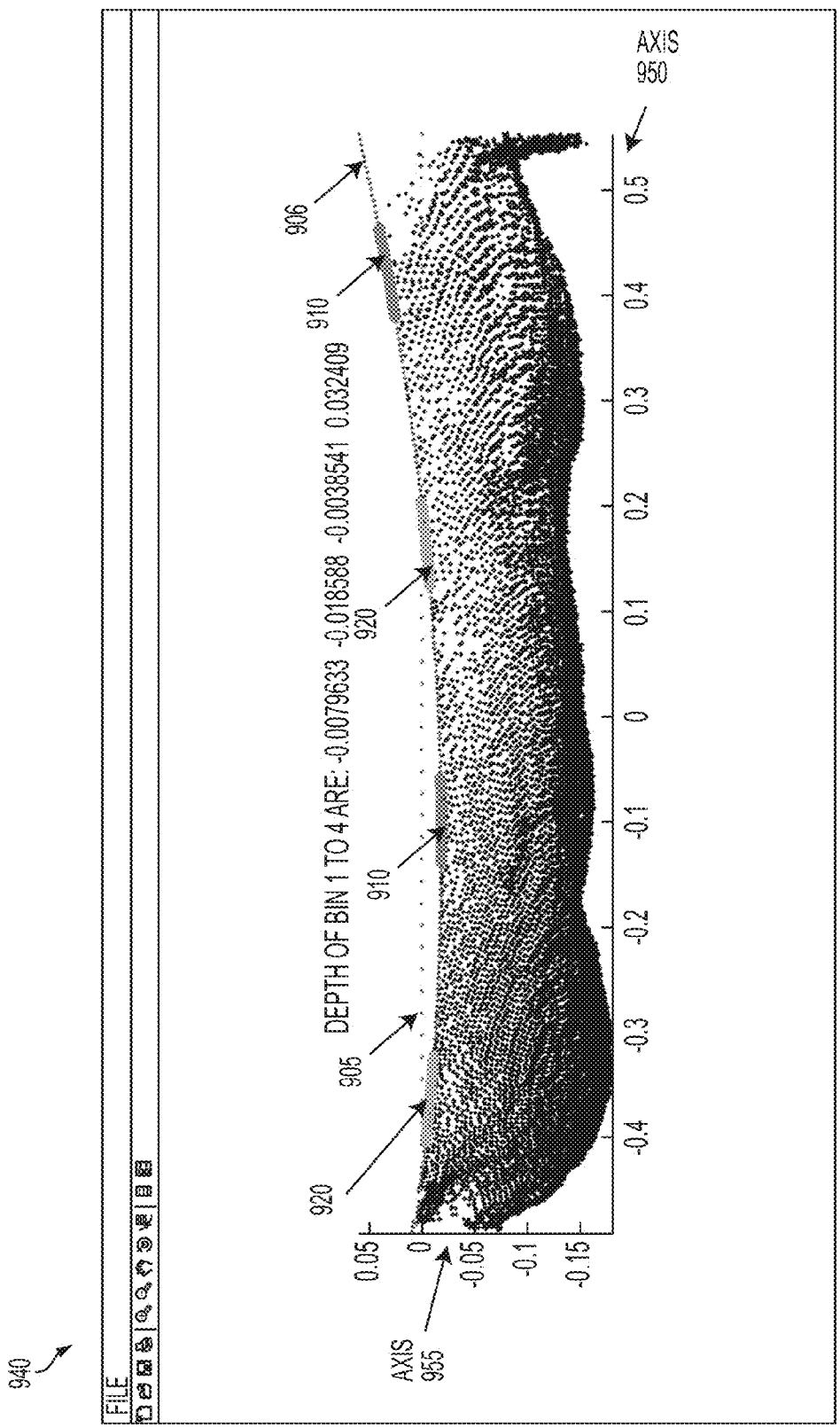
FIG. 3H depicts exemplary fine-tuning adjustments for depth according to one implementation of the invention.

In the illustrated embodiment, the depth adjustment is done in two steps, although in other embodiments it can be done with a greater or lesser number of steps. The first step is to match both the fitting model (e.g., model 192a or 500) and the scanned image (e.g., image 111 or 410), e.g., as shown in FIG. 3G (discussed below), and compare the "center line" of both the model and the image with respect to each other, e.g., as shown in FIG. 3H (discussed below). If the fitting model is "thicker" (i.e., has a greater depth) than the scan, then the half-line of the scan is "in-front" of the half-line of the model, and hence, has a "negative" value. Conversely, if the model is "thinner" (i.e., has a lesser depth) than the scanned image, then the half-line of the scanned image is "behind" the half-line of the model, and hence, has a "positive" value. These values are then used to further refine the weight.

In FIG. 3G, the scanned image (e.g., image 111 or 410) and the selected fitting model (e.g., model 192a or 500) are lined up (e.g., via the fitting engine 193 executing on computing system 185) using the "fat" or "thick" portions of the animal. More specifically, the scanned image is represented by rectangular clouds points (e.g., cloud point 901) and the selected model is represented by circular cloud points (e.g., cloud point 902). The points are plotted in three-dimensions along an x-axis 903, a y-axis 904 and a z-axis 905 of graph 900.

In FIG. 3H, the half-line of the scanned image (e.g., image 111 or 410) and the model (e.g., model 192a or 500) are compared to each other (e.g., via fitting engine 193 executing on computing device 185) with a chart 940 including an x-axis 950 and a z-axis 955. FIG. 3H also happens to show that the animal is bent slightly in this example. The dotted line 905 is the half-line of the fitting model. The black line 906 is the half-line of the scanned image. A first set of points 910 and a second set of points 920 are selected points used in calculating the relative degree of "fatness" (or "thickness" or "depth") at four different positions of the half-line 906. In other embodiments, a lesser or greater number of points can be used to make the comparison.

The depth of the animal can be fine tuned by the ratio (or "differential adjustment parameter") D, which is calculated by comparing how much thicker the scan is to the "fitting model" (or vice versa) by looking at whether one or more points at the top of the scan is/are behind or in front of the half-line 905 of the fitting model. For example, if the scan points at the top of the scanned image are behind the half-line 905 (i.e., to the left of the dotted line 905) of the fitting model, then it means the scanned image is thicker (i.e., has a greater depth) than the fitting model and the final weight needs to be accordingly adjusted. FIG. 3H shows "depth of left bin" and "depth of right bin" (or points at top of the scans) behind the half-line 906 of the scanned image, and are therefore positive. Therefore, the weight of the animal can then be properly adjusted.

Fine-Tune Rump->Ratio-R (and/or Other Body Parts)

Individual sections (e.g., rump, shoulder, back, head, leg(s) or other body part) of the animal can similarly be compared and further refinements can be made. By doing so, adjustments can be made to the determined weight based on individual body parts.

Figure 3I:
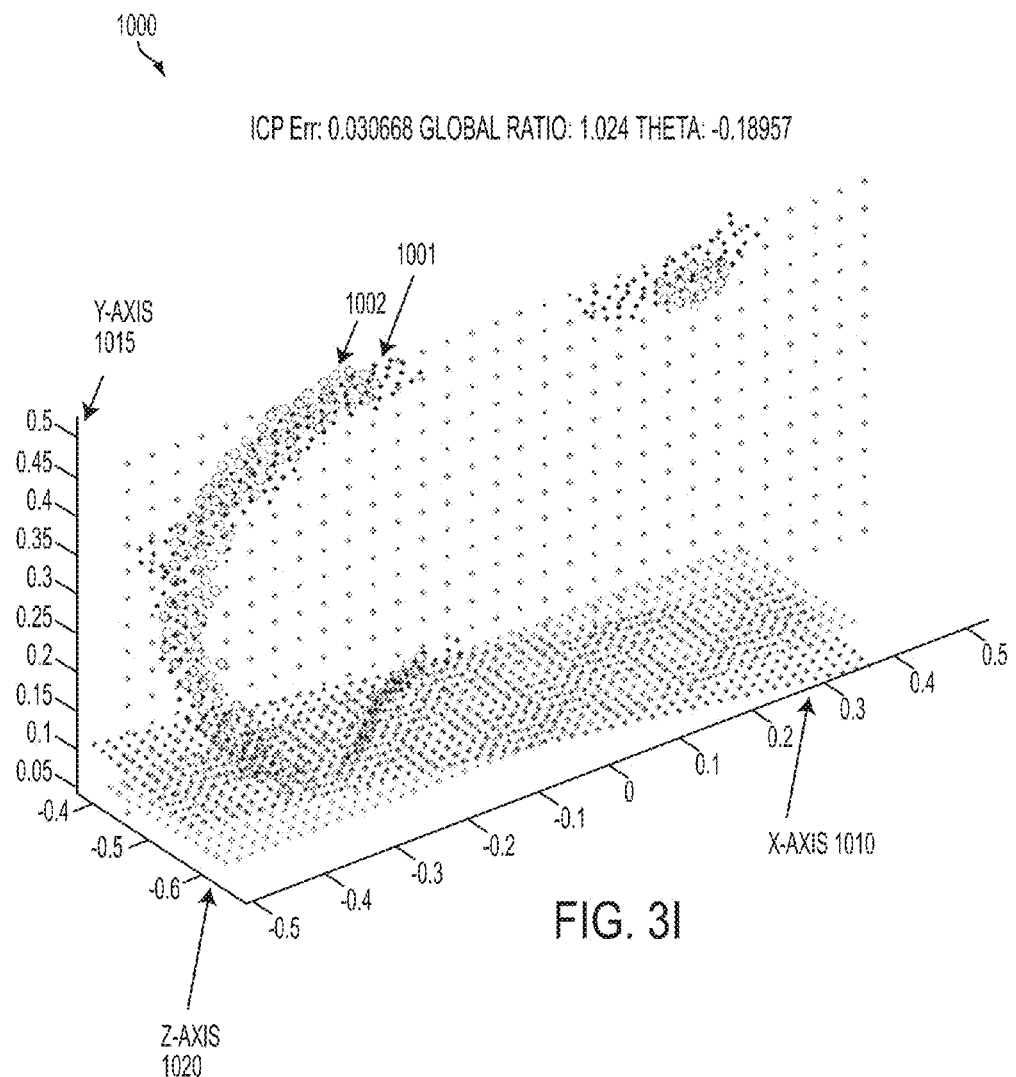
FIG. 3I depicts an exemplary fine tuning adjustment for a rump region of the animal according to one implementation of the invention.

FIG. 3I shows an exemplary comparison of a size of an animal's rump region in a scanned image (e.g., image 111 or 410) and a selected model (e.g., model 192a) according to one implementation of the invention. More specifically, the regions of the scanned image are represented by rectangular clouds points (e.g., cloud point 1001) and the regions of the selected model are represented by circular cloud points (e.g., cloud point 1002). The points are plotted in three-dimensions along an x-axis 1010, a y-axis 1015 and a z-axis 1020 of graph 1000.

As shown, the region of interest is chosen just around the rump area. This ratio (or "differential adjustment parameter") can be used to further adjust the weight of the animal. This is important, for example, since the rump can account for 30 to 40% of the weight of the animal. Although not shown here, many more fine-tuning steps can similarly be added by defining additional regions of interest.

In the illustrated embodiment, other parts of the body (e.g., shoulder, back, head, leg(s)) can be adjusted for using a similar process as the one described above with respect to the rump.

Returning back to FIG. 2, in Step 260, an estimated weight is determined (e.g., by fitting engine 193 executing on computing system 185) for the animal (e.g., animal 50). Generally, the weight is determined by adjusting the known weight of the selected model (e.g., 192a) based upon the one or more differential adjustment parameters. More specifically, since the weight of the selected model is already known, and its relative size to the scanned image (e.g., image 111 or 410) is now known, the weight of the scanned animal can be derived by applying R1 and all the "fine-tuning" adjustment ratios in horizontal (L), vertical (H), and/or depth (D) directions as well as any adjustment ratios for each individual body parts.

The following is an example of an algorithm for determining the weight from a selected model (e.g., model 192a or 500).

W1=Weight ("Fitting Model")

1) Initial adjustment—The weight difference due to the R1 ratio can be calculated using the following formulae. This is derived from a general formula for calculating volume of a cylinder with slight change to accommodate good results based on experimentation. Similar type of an equation could be used to approximate the difference in weight as well.

W2=W1*((R1*R1)+(R1−1))*C-coeff where C-coeff is the coefficient for amount of change different for different animals and breed.

2) Horizontal fine-tune adjustment:

W3=W2*(1+(Ratio-L/R1)*C-coeff-H)) where C-coeff-H is the coefficient for adjusting the weight change due to the horizontal difference.

3) Vertical fine-tune adjustment:

W4=W3*(1+(Ratio-H/R1)*C-coeff-V)) where C-coeff-V is the coefficient for adjusting the weight change due to the vertical difference.

4) Depth fine-tune adjustment:

W5=W4*(1+(Ratio-D/R1)*C-coeff-D)) where C-coeff-D is the coefficient for adjusting the weight change due to the depth difference.

5) Stretch Adjustment

W6=W5+(1+half-line curvature*C-coeff-Curve)) where C-coeff-Curve is the coefficient for adjusting the weight change due to the 'bending' of the animal.

6) Overall adjustment:

W6=W5*C-adjust-total where C-adjust-total is the overall coefficient adjustment to adjust for breed, region or other such factors.

Those skilled in the art will appreciate that the C-coefficients above can be determined by known regression techniques utilizing training data from a plurality of image scans, or otherwise.

Gender Recognition

The gender of an animal (e.g., animal 50) can be determined based upon the process described above. More specifically, for example, a region of an image representing the genitalia of the animal can be compared to a region of a fitting model (e.g., model 192a) having a known gender (i.e., male or female). If the regions match, or more particularly, if the corresponding cloud points match (e.g., as determined via ICP or otherwise), then the animal has the same gender of as the selected model. Alternatively, if the regions do not match (e.g., as determined by ICP or otherwise), then the animal is presumed to have the opposite gender as the selected model.

Graphical User Interface (GUI)

Figure 4:
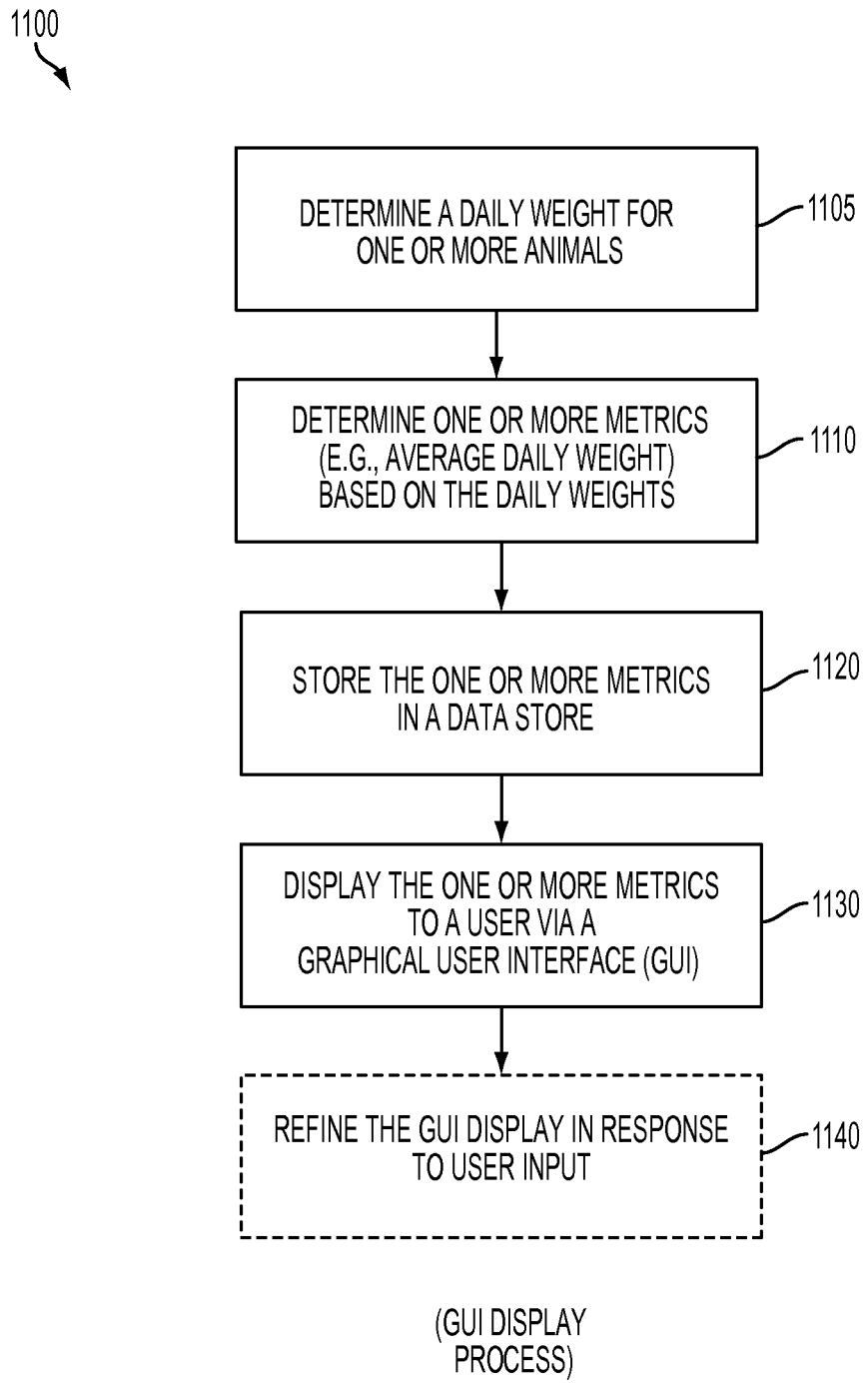
FIG. 4 depicts an exemplary process for displaying animal metrics (e.g., weight) with a graphical user interface (GUI) according to one implementation of the invention.

FIG. 4 depicts an exemplary process 1100 for displaying animal metrics (e.g., weight) with a graphical user interface (GUI) according to one implementation of the invention. Those skilled in the art will appreciate this is meant for example purposes only, and in other embodiments the metrics can be displayed otherwise.

In step 1105, a daily weight is determined (e.g., via process 200) for one or more animals (e.g., animal 50). For example, when the animal goes into a chute (e.g., chute 101) to drink water, a scan (e.g., image 111) of the animal is captured by an imaging system (e.g., imaging system 110). The scan is then checked to make sure it is of good quality. This scan is then processed by a weight algorithm (e.g., process 200) to produce a "scan weight" which is a weight calculated for that scan. The scan weight sometimes has a value of "−1," which means that the scan was of poor quality so that a valid weight could not be calculated.

In any given day, the animal can come into drink water multiple times, and therefore can be scanned multiple times and have multiple estimated weights determined. In order to get a more accurate daily weight, the multiple scan weights can be average within a given day to generate a daily weight which represents the best estimate of the weight for that particular date. An exemplary formula for calculating daily weight can be:

Daily weight=Sum(Scan weights of the same day)/N, where N is the number of scans with valid weights Unfortunately, the animal does not always come into drink water every day. In addition, the weight from a single scan is not necessarily accurate since the animal can stretch and bend sideways at any given time. Therefore, these errors are averaged-out over the course of multiple scans. However, the animal can grow (e.g., around 2 to 3 pounds per day) which means weights are typically averaged over a single day, although not over several days, due to their rapid growth.

Figure 5:
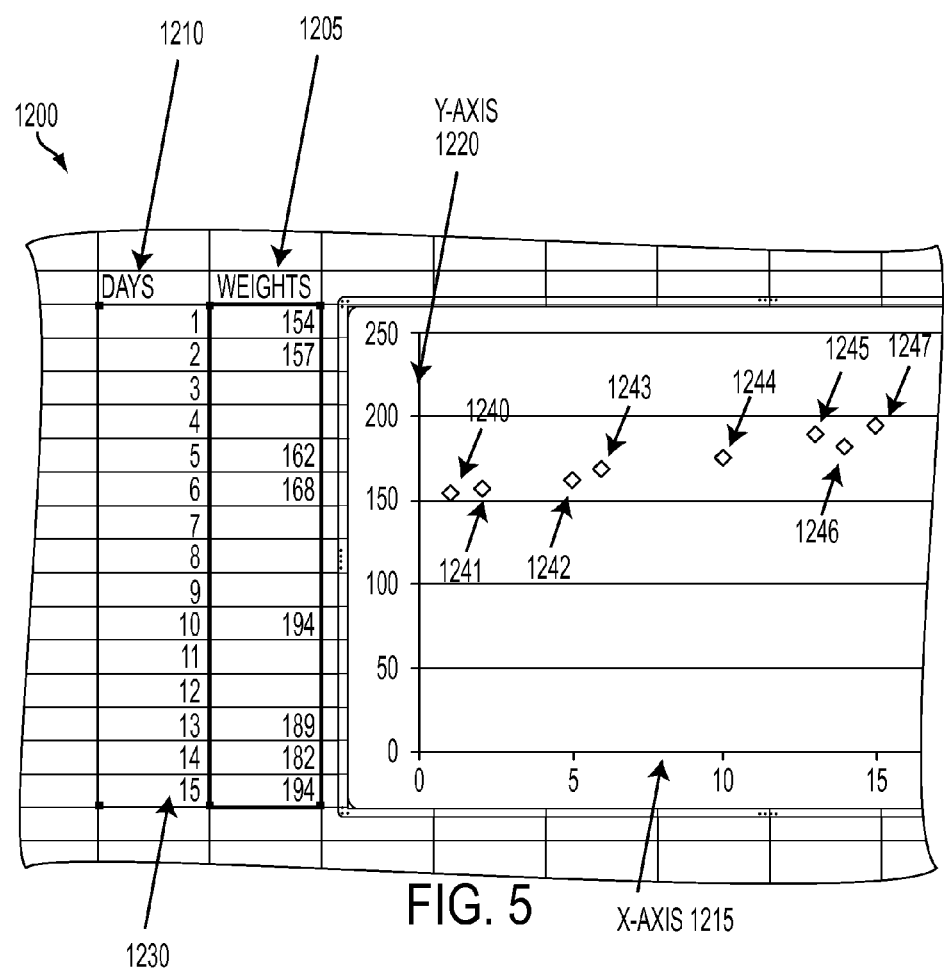
FIG. 5 depicts an x-y axis chart showing exemplary animal daily weights versus date, with weights on the y-axis and date on the x-axis, according to one implementation of the invention.

As shown by way of example in FIG. 5, daily weight 1205 versus date 1210 can be charted on an x-y axis 1215, 1220 with weights on the y-axis 1220 and date on the x-axis 1215. In this exemplary FIG. 5, the 15$^{th}$ day 1230 is the "current" day (or "today"). A best-fit line between these points 1240-1247 can be created. Using this best fit line, the weight of the animal can be "interpolated" in any given date, even into the future. This method of interpolating the weight can be deemed to be more accurate, since it uses many data points in order to produce the weight estimate for the current day. This interpolated weight is the "WEIGHT" of the animal for the current day.

In the illustrated embodiment, to get a "valid" WEIGHT, at least five daily weights must be acquired over a fifteen-day period. In other words, in order to calculate the weight of the animal, we take data from the current day going back fifteen days. If there is less than five "daily weights" within these fifteen days, the current day's WEIGHT is invalid (e.g., having a value of "−1"). If there are at least five daily weights over these fifteen days, then the WEIGHT is valid and can, for example, have a weight anywhere between forty and three-hundred pounds.

Although at least five daily weights must be acquired over a fifteen-day period in the illustrated embodiment to get a "valid" WEIGHT, in other embodiments it can be otherwise, e.g., a greater or lesser number of required weights (e.g., at least seven daily weights, at least 3 daily weights, etc.) and/or over a greater or lesser period of time (e.g., over a forty-five day period, over a ten-day period, etc.).

In step 1110, one or metrics are determined based upon individual daily weights. For example, Average Daily Gain (or "ADG") represents how fast the animal is growing in pounds per day. In the illustrated embodiment, the ADG is the slope of the best fit line, and can be the same line that is used for interpolating the WEIGHT above.

In the illustrated embodiment, individual animals can be associated with one or more groups and/or subgroups. For example, an animal can be associated with a group (e.g., a "farm"), and the groups can have one or more associated sub-groups (e.g., a "barn"). Additionally, the sub-groups (e.g., a "barn") can have additional associated sub-groups (e.g., a "pen"). In the illustrated embodiment, the following metrics are calculated based on the daily weights of step 1105, although other embodiments can calculate a lesser or greater number of such metrics.

Average Pen Weight (APW)

In the illustrated embodiment, the Average Pen Weight can be an average of all the animals within a pen calculated by adding the weights of all the animals in a pen and dividing it by the number of animals in that pen with valid weights.

In the illustrated embodiment, if an animal's weight is invalid, it is not included in the calculation of APW, although in other embodiments it can be otherwise.

If there are no valid weights in a pen, the APW value for that pen can be displayed as "---".

Average Barn Weight (ABW)

In the illustrated embodiment, the Average Barn Weight is the average of all the animals within a barn calculated by adding the weights of all the animals in a barn and dividing it by the number of animals in that barn with valid weights, although in other embodiments, it may be calculated otherwise.

In the illustrated embodiment, if an animal's weight is invalid, it is not included in the calculation of ABW, although in other embodiments it can be otherwise.

Note that ABW is not the same as calculating the average of all the "Average Pen Weights" since the number of animals in each pen will vary.

If there are no valid weights in a barn, the ABW value for that barn can be displayed as "---".

Animal Daily Weight Gain (ADG)

In the illustrated embodiment, the Animal Daily Weight Gain is the average gain of "Animal Weight" over a 14-day period using a best-fit line method over that period, although in other embodiments it can be calculated otherwise.

In the illustrated embodiment, if an animal's weight is invalid, it is not included in the calculation of ADG, although in other embodiments it can be otherwise.

In the illustrated embodiment, an animal's weight needs to be valid on at least different 10 days out of the 14-day period in order for ADG to be considered valid, although other embodiments may utilize different requirements.

If ADG is invalid, then the value for ADG can be displayed as "--.-".

Pen Daily Weight Gain (PADG)

In the illustrated embodiment, the Pen Daily Weight Gain is the average gain for all the animals within a pen, which can be calculated by adding all the valid ADG (Average Daily Gain) values of all animals in a pen and dividing it by the number of animals with valid ADG values in that pen.

In the illustrated embodiment, if an animal's ADG value is invalid, it is not included in the calculation of PADG, although in other embodiments it can be otherwise.

If there are no valid ADG values in a pen, the PADG value for that pen can be displayed as "--.-".

Barn Daily Weight Gain (BADG)

In the illustrated embodiment, the Barn Daily Weight Gain is the average gain for all the animals within a barn, which can be calculated by adding all the valid ADG (Average Daily Gain) values of all animals in a barn and dividing it by the number of animals with valid ADG values in that barn.

In the illustrated embodiment, if an animal's ADG value is invalid, it is not included in the calculation of BADG, although in other embodiments it can be otherwise.

If there are no valid ADG values in a barn, the BADG value for that barn can be displayed as "--.-".

Note that BADG is not the same as calculating the average of all the "Pen Daily Weight Gains" since the number of animals in each pen will vary.

In step 1120, the one or more metrics (e.g., average daily weight, ADG, BADG, etc.) are stored in a data store (e.g., data store 191) for retrieval and display to a user (e.g., using remote device 195) via a graphical user interface (e.g., GUI 196) window, as shown in step 1130. In some embodiments, the GUI can be refined in response to user input (step 1140), e.g., as described in FIGS. 6-9 below or otherwise.

Exemplary GUI Displays

FIGS. 6-13 show exemplary GUI displays according to one implementation of the invention.

Figure 6:
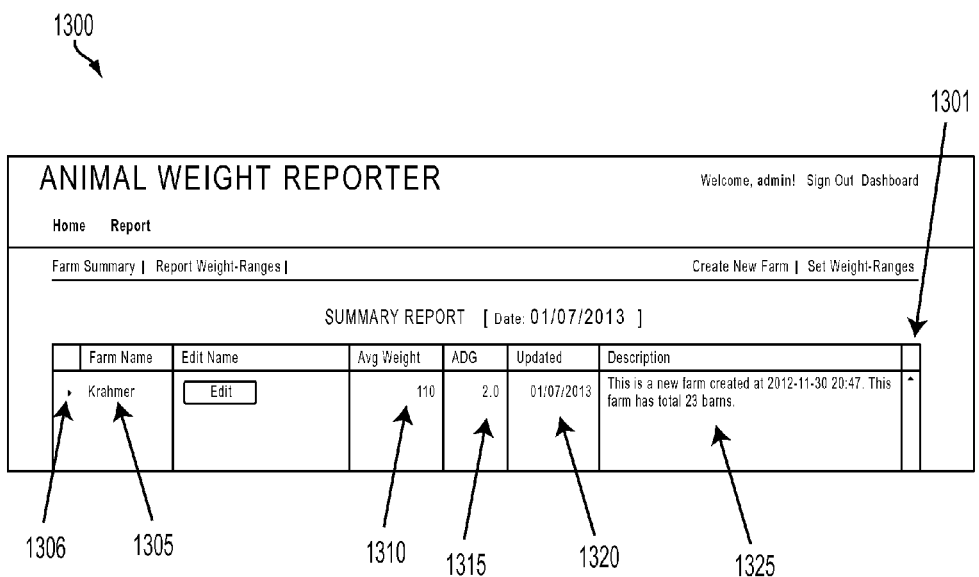

FIG. 6 shows a GUI display screen according to one implementation of the invention, with a GUI display window 1301. After a user (e.g., using remote device 195) signs in to the system, a welcome screen can be presented. The user can then access the heart of the GUI by clicking on the Report link which can bring up the following screen 1300 which can show, in a display window 1301, the farm name 1305, average weight 1310 of all animals in the farm 1305, and the average daily gain 1315 of all animals in the farm 1305, a date the report was updated 1320, and a description of the 1325 (e.g., when it was created, how many barns are in the farm, etc.). The user can click on the triangle 1306 located to the left of the farm name 1305 to show an expanded list of the barns within that farm, e.g., as shown in FIG. 7.

Figure 7:
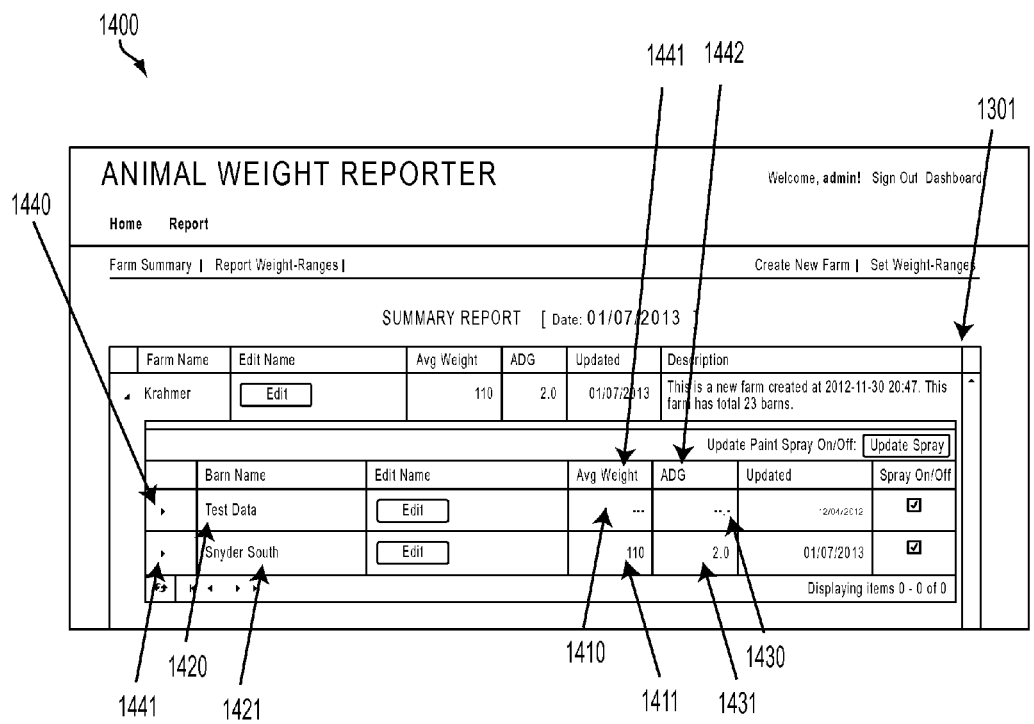

FIG. 7 depicts an exemplary GUI display 1400, according to one implementation of the invention, showing in the same display window 1301, an average weight 1410, 1411 of all animals in each barn 1420, 1421 and the average daily gain 1430, 1431 of all animals in each barn 1420, 1421. The user can also sort the order in which data is displayed by clicking one of the table headers such as Barn Name 1440, Ave Weight 1441, or ADG 1442. The user can click on the triangle 1440, 1441 to the left of any barn name 1420, 1421 to show an expanded list of pens within that barn, e.g., as shown in FIG. 8.

FIG. 8 depicts an exemplary display 1500 according to one implementation of the invention, showing in the same display window 1301, an average weight 1510 of all animals in each pen 1520 and the average daily gain 1530 of all animals in each pen 1520. The user can also sort the order in which data is displayed by clicking one of the table headers such as Pen Name, Ave Weight, or ADG. The user can click on the triangle (e.g., triangle 1521) to the left of any pen name (e.g., Pen Name 1520 "10000001") to show an expanded list of animals (identified by their RFID numbers) within that pen 1520, as shown in FIG. 9.

FIG. 9 depicts an exemplary display 1600 according to one implementation of the invention, showing in the same display window 1301, a list of all animals with valid weights 1610 and average daily gain values 1620 of all animals in a pen 1625. The user can also sort the order in which data is displayed by clicking one of the table headers such as RFID, Weight, or ADG.

The user can compress any expanded list by clicking on the arrow (e.g., arrow 1630) to the left of the name of an entity (e.g., pen, barn, or farm) with an expanded list. In the illustrated embodiment, the lists can be expanded and compressed in a single display window (e.g., screen 1301), such as a single web page, or a single element within a web page, in order to allow for quick and easy user navigation, although other embodiments may use multiple screens.

Figure 10:
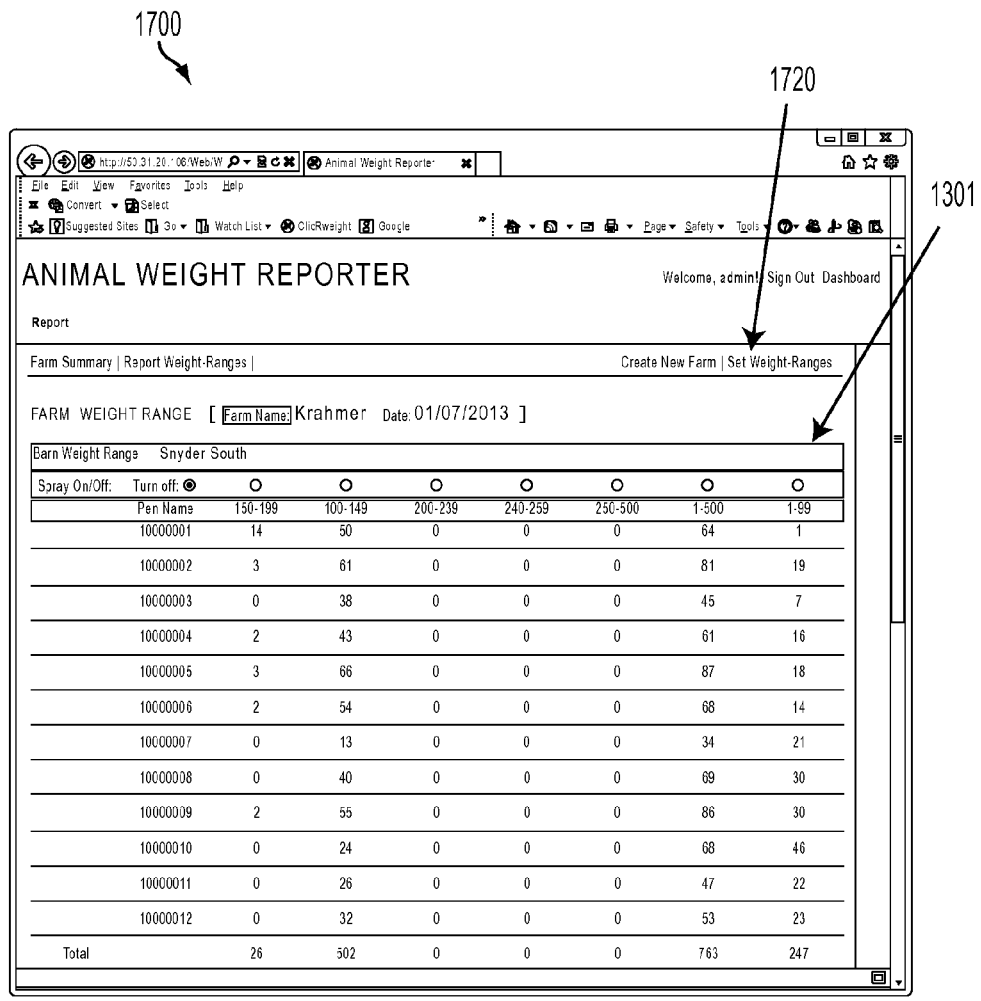

FIG. 10 depicts an exemplary weight range table displayed in a GUI 1700 showing the number of animals within particular weight ranges according to one implementation of the invention. In the illustrated embodiment, users (e.g., using remote device 195) can define specific weight ranges (e.g., 155 to 199 lbs.) to show the number of animals in all pre-defined weight ranges across all pens and barns. This can provide the user with a good overview of weight distributions for the entire operation. In the illustrated embodiment, if an animal's weight is invalid, it is not included in the data displayed in the weight range table, although in other embodiments it can be otherwise.

For example, to set weight ranges, the user can click on the "Set Weight-Ranges" link 1720 in the upper right hand corner, which causes to GUI to display a separate display 1800, as shown in exemplary FIG. 11. The GUI 1800 allows, for example, a user to edit or delete an existing weight range or set up a new weight range according to one implementation of the invention. In the illustrated embodiment, for example, a user can create a new weight range by clicking on "Create New Weight-Range" link 1810.

FIG. 12 shows an exemplary GUI display 1900, according to one embodiment of the invention, wherein a user can enter desired minimum and maximum weight values. In the illustrated embodiment, for example, entering a minimum value in field 1905 and a maximum value in field 1910, and selecting the "Create" link 1920, can create a new weight range.

Paint Sprayer

In the illustrated embodiment, each pen can be equipped with a paint sprayer (e.g., marking device 160), which can be used to paint animals (e.g., animal 50) that are within a user-defined weight range. The paint sprayer can be positioned near the water spout where animals go to drink water. If an animal accesses the water spout, the system (e.g., control system 101) can determine if that animal's current weight is within a pre-defined weight range for being sprayed.

The weight ranges for the paint sprayer settings can be set on a per-farm basis. All pens within a farm can have their paint sprayer range settings set to operate across the same weight range.

Figure 13:
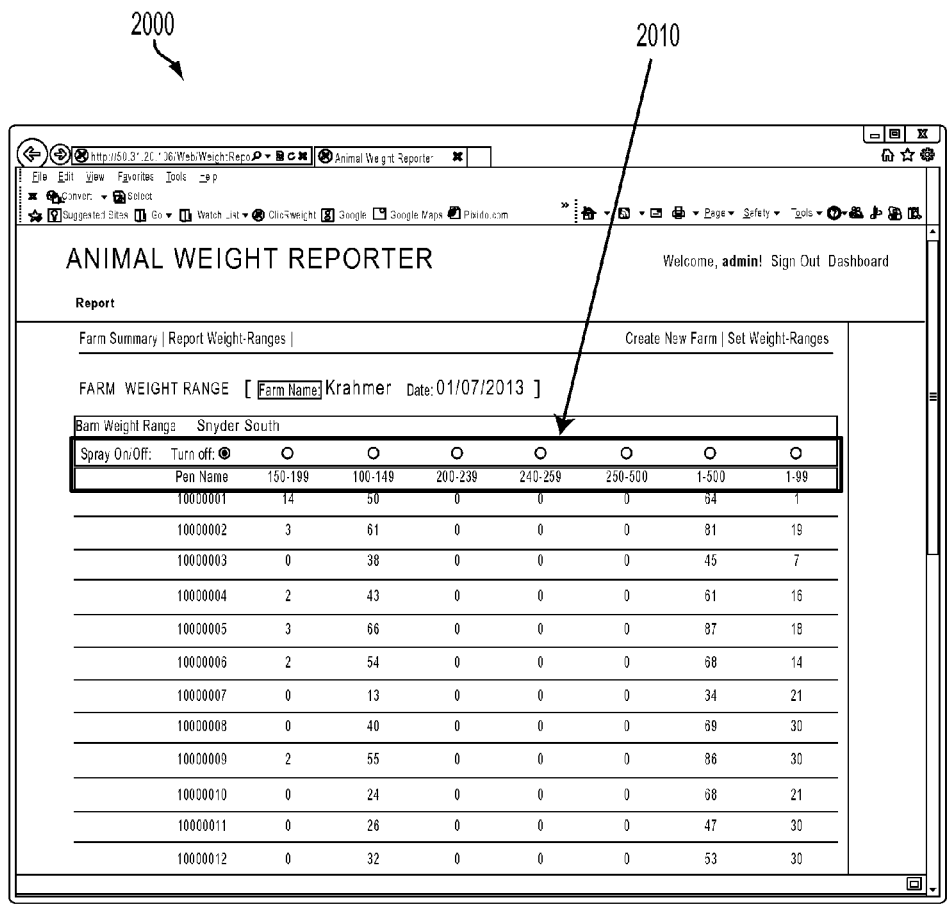

The weight range settings for paint sprayer control can be changed by the user via the GUI at any time, e.g., as shown in highlighted portion 2010 of the GUI display 2000 in FIG. 13.

Forecasting Animal Weight

FIG. 14 depicts an exemplary GUI 3000 displaying a weight range table according to one implementation of the invention.

As discussed above, users (e.g., using remote device 195) can interact with the GUI (e.g., GUI 196) to display livestock metrics. In this example, the GUI 3000 displays a number of animals (e.g., 0, 1, 2, 3, etc.) within certain weight arranges, organized by pen, barn and farm, although in other embodiments, they may be organized by different groups and/or sub-groups.

The GUI 3000 can additionally include a "Forecast" link 3010. A user can access (e.g., display) predicted livestock metrics (e.g., weight) by using this link 3010, although other embodiments may provide other features for generating and/or displaying such predicted metrics. For example, forecasted metrics may be automatically generated and/or displayed (e.g., by control system 185), or they may generated and/or displayed in response to other types of user input.

FIG. 15 depicts an exemplary GUI 3100 displaying a forecast weight range table according to one implementation of the invention. This can be helpful, for example, because it can allow a manager (or other user) to see what the weight range table (e.g., the weight range table of GUI 3000) would look like in the future (e.g., a week later, two weeks later, etc.). Such information can help with a variety of management activities.

In the illustrated embodiment, a future weight can be predicted (or "forecasted") for one or more animals. For example, a forecasted weight for an animal can be determined based upon their growth rate (e.g., ADG). More specifically, in the illustrated embodiment, the forecasted weight is determined by multiplying an animal's ADG (e.g., the current day's ADG or most recent ADG) by the number of days ahead to predict (e.g., 7-days, 14-days, 21-days, 28-days, etc.), and adding the result to the animals current daily weight (e.g., average daily weight, "valid" daily weight, "interpolated" daily weight, etc.). The number of days ahead to predict can be customizable (e.g., by a user, systems administrator, etc.). In other embodiments, other methods can be used to determine the forecasted weight, such as methods that take into account multiple ADGs, the age or gender of the animal, or other characteristics and/or metrics described above.

In this example, shown in FIG. 15, the GUI 3100 displays forecasted weight ranges (e.g., 0-170 lbs.) for a selected number of days in the future (e.g., 14-days). The user can select the number of days from several options in this example, including 7-days, 21-days, and 28-days, although these are shown for exemplary purposes only, and other embodiments may allow for a greater or lesser number of options, or a greater or lesser number of days in the future the system can forecast.

Continuing this example, the GUI 3100 displays a number of animals (e.g., 0, 1, 2, etc.) that are forecasted to be within a certain weight range (e.g., 0-170 lbs, 171-224 lbs, etc.) for the specified amount of days (e.g., 14-days) from the current day. More specifically, the display is organized by pen, and the GUI 3100 displays the number of animals within each pen that are predicted to be within a particular weight range. In other displays, the display may be organized by other groups (e.g., a farm) or sub-groups (e.g., a barn).

It will be appreciated that any of the following methods can be used in connection with calculating the values described above (e.g., ADG, forecasted weight, etc.):

(i) best fit line method; (ii) best fit curve method; (iii) second order curve method; (iv) Random Sample Consensus (RANSAC) method; (v) ICP; (vi) or process 200, described above.

System Hardware and Software

The invention can be implemented in a compact, handheld imaging device, or in a computing system remote from an imaging device. The invention can be implemented in a closed-ended chute including a control wall having an animal feeder, an animal presence indicator and an imaging device having a field-of-view substantially unobstructed by walls of the chute. The implementation can include a control system communicatively connected to the animal presence indicator and the imaging device, and configured to control the imaging device based upon information communicated by the animal presence indicator.

The above-described techniques can also be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the technology can be embodied in other specific forms without departing from the spirit or essential characteristics thereof. The foregoing embodiments are therefore to be considered in all respects illustrative rather than limiting of the technology described herein. All changes that come within the meaning and range of equivalency of the claims are therefore intended to be embraced therein. The steps of the technology can be performed in a different order and still achieve desirable results.

It will be appreciated that the illustrated embodiment and those otherwise discussed herein are merely examples of the technology and that other embodiments, incorporating changes thereto, fall within the scope of the invention.

In view of the foregoing, what we claim is:

1. A computerized method for estimating a weight of an animal, comprising:
   acquiring an image of an animal;
   comparing, by a computing device, the image to a plurality of models to determine a selected one of the plurality of models that optimally matches a size or shape of the animal, wherein each of the plurality of models has a known weight;
   adjusting, by the computing device, either (i) the image relative to the selected model or (ii) the selected model relative to the image, wherein the adjusting occurs for both height and length;
   determining, by the computing device, a first differential adjustment parameter based upon the adjustment of the image or model;
   tuning, by the computing device, the first differential adjustment parameter based upon one or more second differential adjustment parameters, the second differential adjustment parameters relating to measurement of anatomical features of the animal as represented in the image; and
   determining, by the computing device, a weight of the animal by adjusting the known weight of the selected model based upon the tuned differential adjustment parameter.

2. The method of claim 1, wherein the image includes a plurality of cloud points representing the animal in three-dimensions, and each of the plurality of models includes a plurality of cloud points representing an animal of a known weight in three-dimensions.

3. The method of claim 2, further comprising determining, by the computing device, the selected model by:
   calculating a deviation in cloud points between the image and each of the plurality of models; and
   selecting the model having the smallest deviation in cloud points.

4. The method of claim 2, further comprising determining, by the computing device, the model by:
   calculating an iterative closest point (ICP) error between the image and each of the plurality of models; and
   selecting the model having the smallest ICP error.

5. The method of claim 2, further comprising adjusting, by the computing device, along any of an x-axis, y-axis, or z-axis, at least one cloud point of (i) the image relative to the selected model or (ii) the selected model relative to the image.

6. The method of claim 2, further comprising determining, by the at least one computing device, a gender of the animal by comparing a region of the image representing a gender of the animal to a corresponding region of a model having a known gender.

7. The method of claim 2, further comprising determining, by the computing device, the selected model based upon a gender of the animal.

8. The method of claim 1, wherein one of the second differential parameters corresponds to a depth of the animal.

9. The method of claim 1, wherein one of the second differential parameters corresponds to a body part of the animal.

10. The method of claim 1, wherein one of the second differential adjustment parameters corresponds to a depth of the image relative to the model.

11. The method of claim 1, wherein the image comprises a plurality of images.

12. A data processing system for estimating weight of an animal, comprising:
   a data store coupled to at least one computing device, wherein the data store stores a plurality of models that each represent an animal having a known weight;
   a fitting engine that executes on the at least one computing device, wherein the fitting engine
   (i) compares an image of an animal to the plurality of models to determine a selected one of the plurality of models that optimally matches a size and/or a shape of the animal;
   (ii) adjusts either (i) the image relative to the selected model or (ii) the selected model relative to the image, wherein the adjusting occurs for both height and length;
   (iii) determines a first differential adjustment parameter based upon the adjustment of the image or model;
   (iv) tunes the first differential adjustment parameter based upon one or more second differential adjustment parameters, the second differential adjustment parameters relating to measurement of anatomical features of the animal as represented in the image; and
   (v) determines a weight of the animal by adjusting the known weight of the selected model based upon the tuned differential adjustment parameter.

13. The system of claim 12, wherein the image includes a plurality of cloud points representing the animal in three-dimensions, and each of the plurality of models includes a plurality of cloud points representing an animal of a known weight in three-dimensions.

14. The system of claim 13, wherein the fitting engine determines the selected model by:
   calculating a deviation in cloud points between the image and each of the plurality of models; and
   selecting the model having the smallest deviation in cloud points.

15. The system of claim 14, wherein the fitting engine adjusts at least one cloud point of (i) the image relative to the selected model or (ii) the selected model relative to the image, along any of an x-axis, y-axis, or z-axis.

16. A computerized method for displaying animal metrics with a graphical user interface (GUI), comprising:
   determining, by at least one computing device, a daily weight for each of one or more animals for each of a plurality of days, wherein the daily weight is determined by:
   (i) acquiring an image of an animal;
   (ii) comparing the image to a plurality of models to determine a selected one of the plurality of models that optimally matches a size or shape of the animal, wherein each of the plurality of models has a known weight;

(iii) adjusting either (a) the image relative to the selected model or (b) the selected model relative to the image, wherein the adjusting occurs for both height and length;

(iv) determining a first differential adjustment parameter based upon the adjustment of the image or model;

(v) tuning the first differential adjustment parameter based upon one or more second differential adjustment parameters, the second differential adjustment parameters relating to measurement of anatomical features of the animal as represented in the image; and (vi) determining a weight of the animal by adjusting the known weight of the selected model based upon the one or more tuned differential adjustment parameter;

determining, by the at least one computing device, an average daily weight for each of the one or more animals, wherein the average daily weight for an animal is determined based upon the plurality of daily weights for the animal;

storing, in a data store coupled to the at least one computing device, the average daily weight for each of the one or more animals, rendering, by a remote computing device coupled to the data store, a graphical user interface (GUI) window displaying the average daily weight for at least one of the animals.

17. The method of claim 16, further comprising associating each of the one or more animals with any one of a plurality of barns.

18. The method of claim 17, further comprising displaying, in the GUI window, the average daily weight for each animal associated with a selected barn, wherein the barn is selected in response to user interaction with the GUI window.

19. The method of claim 18, further comprising:

(i) associating each of the one or more animals with any one of a plurality of pens;

(ii) associating each of the plurality of pens with any one of the plurality of barns;

(iii) determining an average pen weight for at least one of the plurality of pens, wherein average pen weight is determined by averaging the daily weight of the one or more animals associated with that pen; and (iv) displaying, in GUI window, the average pen weight for a selected pen, wherein the pen is selected in response to user interaction with the GUI window.

20. The method of claim 16, further comprising displaying, in the GUI window, a plurality of identifiers, wherein each identifier is uniquely associated with one of the animals.

21. The method of claim 20, wherein each identifier comprises an RFID number.

22. The method of claim 16, wherein the GUI window comprises a region of a web page.

23. The method of claim 16, further comprising determining an average daily weight gain (ADG) for at least one of the one or more animals, wherein the ADG for an animal is based upon a plurality of daily weights for that animal.

24. The method of 23, further comprising determining a forecasted weight for at least one of the one or more animals, wherein the forecasted weight for an animal is based upon the ADG for that animal.

25. The method of claim 24, wherein the forecasted weight is determined by multiplying an ADG for an animal for a current day by a number of selected days after the current day, and adding the result to the average daily weight.

26. The method of claim 25, further comprising determining a number of animals having a forecasted weight within a range of weights.

27. The method of claim 25, further comprising displaying the number of animals having a forecasted weight within the range of weights.

28. The method of claim 16, wherein the ADG is determined using a best-fit line method.

* * * * *